(12) United States Patent
Shinobudani et al.

(10) Patent No.: US 10,179,427 B2
(45) Date of Patent: Jan. 15, 2019

(54) MULTI-STAGE ROLL TYPE SHEET MOLDING APPARATUS

(71) Applicant: THE JAPAN STEEL WORKS, LTD., Tokyo (JP)

(72) Inventors: Koji Shinobudani, Hiroshima (JP); Makoto Shimodori, Hiroshima (JP); Atsushi Chikaraishi, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 27 days.

(21) Appl. No.: 15/371,357

(22) Filed: Dec. 7, 2016

(65) Prior Publication Data
US 2017/0165881 A1 Jun. 15, 2017

(30) Foreign Application Priority Data
Dec. 11, 2015 (JP) .................................. 2015-242516

(51) Int. Cl.
*B29C 43/24* (2006.01)
*B29C 43/46* (2006.01)
(Continued)

(52) U.S. Cl.
CPC .............. *B29C 43/46* (2013.01); *B29C 43/24* (2013.01); *B29C 43/245* (2013.01);
(Continued)

(58) Field of Classification Search
CPC ....... B29C 43/24; B29C 43/245; B29C 43/46; B29C 2043/467; B29C 2043/468
See application file for complete search history.

(56) References Cited

U.S. PATENT DOCUMENTS 3,635,627 A * 1/1972 Palmer .................. B21B 37/165
425/141
4,214,857 A * 7/1980 Woeckener ........... B29C 43/245
425/141
(Continued)

FOREIGN PATENT DOCUMENTS

JP 54-46264 A 4/1979
JP 57-74122 A 5/1982
(Continued)

OTHER PUBLICATIONS

Communication dated Jun. 14, 2017, issued by the Japanese Patent Office in counterpart Japanese Patent Application No. 2015-242516.

*Primary Examiner* — James P Mackey
(74) *Attorney, Agent, or Firm* — Sughrue Mion, PLLC

(57) ABSTRACT

A multi-stage roll type sheet molding apparatus includes four or more molding rolls including a touch molding roll, a main molding roll and finish molding rolls disposed in the horizontal direction in parallel to each other, in which a molten sheet is supplied downward from above to a first nip part interposed between the touch molding roll and main molding roll, the sheet is compressed by the molding rolls, and the compressed sheet is windingly fed sequentially from the main molding roll to the finish molding rolls, thereby molding a sheet having a specific thickness. The apparatus further includes a rear-stage side rail for guiding the finish molding rolls in a horizontally movable manner and second to fourth hydraulic cylinders for horizontally moving the finish molding rolls to in such a manner that they can pressurize the sheet.

14 Claims, 11 Drawing Sheets

(51) Int. Cl.
*B29K 105/00* (2006.01)
*B29L 7/00* (2006.01)
*B29C 33/02* (2006.01)

(52) U.S. Cl.
CPC ...... *B29C 33/026* (2013.01); *B29C 2043/467* (2013.01); *B29C 2043/468* (2013.01); *B29K 2105/0067* (2013.01); *B29L 2007/002* (2013.01)

(56) References Cited

U.S. PATENT DOCUMENTS

| | | | | |
|---|---|---|---|---|
| 4,986,177 | A * | 1/1991 | Masek | B29C 43/24 100/163 R |
| 5,295,803 | A * | 3/1994 | Ogawa | B29C 43/245 100/331 |
| 5,433,897 | A * | 7/1995 | Kanome | B29C 43/222 264/1.33 |
| 5,456,871 | A * | 10/1995 | Harada | B29C 43/24 264/175 |
| 7,754,116 | B2 * | 7/2010 | Mizunuma | B29C 43/245 264/173.1 |
| 8,262,966 | B2 | 9/2012 | Becker et al. | |
| 2008/0034986 | A1 * | 2/2008 | Lucas | B29C 43/24 100/35 |

FOREIGN PATENT DOCUMENTS

| | | |
|---|---|---|
| JP | 61-230623 A | 10/1986 |
| JP | 62-7519 A | 1/1987 |
| JP | 62-42814 A | 2/1987 |
| JP | 3-128215 A | 5/1991 |
| JP | 6-198666 A | 7/1994 |
| JP | 6-328483 A | 11/1994 |
| JP | 7-205175 A | 8/1995 |
| JP | 10-264193 A | 10/1998 |
| JP | 10264194 A | 10/1998 |
| JP | 2000-43071 A | 2/2000 |
| JP | 2001-129845 A | 5/2001 |
| JP | 3194904 B2 | 8/2001 |
| JP | 2006-240096 A | 9/2006 |
| JP | 2008-49630 A | 3/2008 |
| JP | 2011-68005 A | 4/2011 |
| JP | 2011116027 A | 6/2011 |
| WO | 2012/077317 A1 | 6/2012 |

* cited by examiner

MULTI-STAGE ROLL TYPE SHEET MOLDING APPARATUS

This application claims priority from Japanese Patent Application No. 2015-242516 filed on Dec. 11, 2015, the entire subject-matter of which is incorporated herein by reference.

TECHNICAL FIELD

The disclosure relates to a sheet molding apparatus for pressurizing molten resin pushed out through a T die from a molten resin push-out machine with a molding roll to mold a long resin film or sheet and, in particular, to a multi-stage roll type sheet molding apparatus for a sheet of a specific thickness using four or more molding rolls.

BACKGROUND

As a method for molding a film or a sheet, for example, there is known a pressure molding method in which molten resin pushed out from a T die is inserted and pressed (which is hereinafter expressed as compressed) by a pair of molding rolls with high rigidity, and is molded into a sheet-like shape and is cooled simultaneously.

As a typical apparatus for embodying the above pressure molding method, as shown in FIG. 11A, there is available a sheet molding apparatus 100 structured such that three molding rolls 101, 102 and 103 are disposed parallel to each other in the horizontal direction (see, for example, JP-A-2011-116027 and Japanese Patent No. 3194904).

The sheet molding apparatus 100 includes a touch molding roll 101, a main molding roll 102 and a finish molding roll 103 sequentially parallel disposed from the front-stage side toward the rear-stage side in the horizontal direction, in which a molten sheet 105 is supplied downward from a T die 106 existing above to a nip part 104 interposed between the touch molding roll 101 and main molding roll 102, is compressed by the touch molding roll 101 and main molding roll 102, and the compressed sheet 105 is wound and fed from the main molding roll 102 to the finish molding roll 103, thereby molding the sheet 105 having a specific thickness.

Here, the nip part 104 means a roll gap in which the sheet 105 is held and compressed by the two adjacent molding rolls 101 and 102.

In the sheet molding apparatus 100, between the touch molding roll 101 and main molding roll 102, the outer peripheral surfaces of the touch molding roll 101 and main molding roll 102 are simultaneously contacted with both sides of the sheet 105. Specifically, through the contact with the touch molding roll 101, the sheet 105 is cooled just instantly, whereas most of cooling of the sheet 105 is attained by the main molding roll 102.

The sheet winding angle of the finish molding roll 103 is normally 90° and the cooling of the sheet 105 ends at a position where the sheet 105 is parted from the finish molding roll 105.

A thick sheet requires a long cooling time and thus is normally molded at a low speed, whereas a thin sheet requires a short cooling time and thus is necessarily molded at a high speed.

Referring to the number of cooling times on the front surface (upper surface) and back surface (lower surface) of the sheet 105 by the three molding rolls 101 to 103, the back surface of the sheet 105 is cooled two times, whereas the front surface is cooled one time.

The diameters of the three molding rolls 101 to 103 are all set equal; or, the diameters of the main molding roll 102 (the second roll) and finish molding roll 103 (the third roll) are set large, while the touch molding roll 101 (the first roll) is normally set small.

The reason why the diameters of the main molding roll 102 and finish molding roll 103 with great sheet winding angles are set large is that the cooling heat required is directly proportional to the sheet contact length.

Also, as a related-art sheet molding apparatus using four or more molding rolls, for example, there are known apparatus which are disclosed in JP-A-H10-264194 and U.S. Pat. No. 8,262,966.

As shown in FIG. 11B, a sheet molding apparatus 110 disclosed in the JP-A-H10-264194 includes: a first roll 111 and a second roll 112 disposed parallel to each other on front and rear stage sides in the horizontal direction; and, a third roll 113, a fourth roll 114 and a fifth roll 115 sequentially disposed parallel to each other downwardly of the second roll 112, in which a molding material 116 formed of thermoplastic resin such as vinyl chloride resin (PVC) or rubber lumps supplied between the first and second rolls 111 and 112 is kneaded and molten with high line pressure by the first and second rolls 111 and 112, and the molten molding material 116 is rolled by the third to fifth rolls 113 to 115 disposed downwardly of the second roll 112, thereby molding a sheet 117.

Here, the line pressure means a force acting on a unit area of 1 cm in the roll longitudinal direction when a pair of rolls are pressed against each other (for example, 98N/cm (10 Kg/cm)); and, the line pressure is also called nip pressure.

As shown in FIG. 11C, a sheet molding apparatus 120 according to the U.S. Pat. No. 8,262,966 includes: a first roll 121 and a second roll 122 disposed in parallel to each other in the vertical direction; and, a large number of small-diameter rolls 123 which are disposed parallel to the first roll 121 on the upper stage side in the horizontal direction and the heights of which are different from each other alternately in the vertical direction, in which a molding material 125 is supplied in a sheet-shaped manner to a nip part 124 intervening between the first and second rolls 121 and 122 from the lateral direction, is compressed by the first and second rolls 121 and 122, and the compressed sheet-shaped molding material 125 is sequentially wound on and fed by the large number of small-diameter rolls 123, thereby molding a sheet.

However, the related-art sheet molding apparatus 100 shown in FIG. 11A has the following problems.

That is, since the number of molding rolls 101, 102, 103 used to mold the sheet 105 is three and the number of nip parts 104, 107 for holding and pressurizing the sheet 105 by the mutually adjacent molding rolls 101, 102 is two, there cannot be secured a sufficient contact cooling distance for cooling the molding rolls 101, 102, 103 and sheet 105 in a state where they are closely contacted with each other without intervening an air layer between them.

Also, with respect to the number of cooling times on the sheet 105 by the three molding rolls 101, 102, 103, the front surface (upper surface) side of the sheet 105 is cooled one time and the back surface (lower surface) side is cooled two times, that is, the number of cooling repetition times on both sides of the sheet 105 is small. Also, when compared with the roll contact time between the main molding roll 102 and sheet 105, the roll contact time between the touch molding roll 101 and sheet 105 is extremely short; the roll contact time between the finish molding roll 103 and sheet 105 is about half of the roll contact time between the main molding roll 102 and sheet 105; and, with respect to the total roll contact time between the main molding roll 102 and sheet 105, the time on the sheet front side is longer than the time on the sheet back side. Thus, the high temperature part of the sheet 105 is unevenly distributed in the sheet back side surface distant from the contact surface with the main molding roll 102, thereby worsening cooling efficiency.

Therefore, the related-art sheet molding apparatus 100 lacks cooling capacity in total and thus is incapable of molding a thick sheet slow to cool (for example, a sheet having a thickness dimension t=0.6 mm or larger) at high speeds and with good quality.

Also, since a thin sheet (for example, a sheet having a thickness dimension t=0.1 to 0.6 mm or smaller) is quick to cool, it is necessarily molded at high speeds. However, since there are provided only the two nip parts 104 and 107, the holding/pressing operation in the nip parts 104, 107 is executed only two times in total, thereby degrading the quality such as gloss and transparency of the sheet surface. Thus, the thin sheet quick to cool cannot be molded at high speeds and with high quality.

And, the related-art sheet molding apparatus 110 shown in FIG. 11B is structured such that the molding material 116 is kneaded and molten by the first roll 111 and second roll 112 with high line pressure and the molten molding material 116 is rolled by the third to fifth rolls 113 to 115 disposed downwardly of the second roll 112.

Therefore, this apparatus 110 is different in the basic structure from the related-art sheet molding apparatus 100 shown in FIG. 11A which relates to the premise technique of the invention and is structured such that, after previously kneaded and molten, the molten sheet 105 is supplied downward from above, after the front and back surfaces of the molten sheet 105 are simultaneously contacted by the touch molding roll 101 and main molding roll 102, it is compressed by these rolls, and the compressed sheet 105 is wound on and fed from the main molding roll 102 to the following finish molding roll 103, thereby molding the sheet 105 having a specific thickness.

Also, according to the related-art sheet molding apparatus 120 shown in FIG. 11C, the sheet-shaped molding material 125 is supplied to the nip part 124 intervening between the first and second rolls 121 and 122 from the lateral direction.

In this apparatus, it is difficult to handle the sheet-shaped molding material 125 when it is fed to the nip part 124 intervening between the first and second rolls 121 and 122. Also, when molding a thin sheet, the sheet-shaped molding material 125 hangs down due to gravity so that cooling starts at one side of the molding material to be contacted first with the second roll 122, thereby disabling uniform cooling of both sides of the molding material. Thus, the apparatus 120 is incapable of molding a thin sheet which requires double-side simultaneous contact of the sheet-shaped molding material 125 with the first and second rolls 121 and 122.

SUMMARY

The disclosure provides a multi-stage roll type sheet molding apparatus capable of molding both of a thin sheet and a thick sheet at high speeds and with high quality.

According to one illustrative aspect of the disclosure, there may be provided a multi-stage roll type sheet molding apparatus comprising: four or more molding rolls comprising a touch molding roll, a main molding roll and a plurality of finish molding rolls disposed in parallel to each other in this order from a front stage side toward a rear stage side in a horizontal direction, wherein the sheet molding apparatus is configured to supply a molten sheet downward from above to a nip part between the touch molding roll and the main molding roll, compress the sheet by the touch molding roll and the main molding roll, and feed the compressed sheet sequentially windingly fed from the main molding roll to the finish molding rolls, thereby molding a sheet having a specific thickness, and wherein the sheet molding apparatus further comprises: a guide device configured to horizontally move the finish molding rolls respectively relative to molding rolls disposed on the front-stage side; and a slide drive device configured to horizontally move the finish molding rolls respectively relative to a respective one of the molding rolls disposed adjacently on the front-stage side for pressing the sheet therebetween.

Roll diameter of the main molding roll may be set smaller than roll diameter of a first finish molding roll of the finish molding rolls, the first finish molding roll being adjacent to the main molding roll.

Roll diameter of the main molding roll and roll diameter of a first finish molding roll of the finish molding rolls may be set smaller than roll diameter of a second finish molding roll of the finish molding rolls, the first finish molding roll being adjacent to the main molding roll, the second finish molding roll being adjacent to the first finish molding roll.

There may be provided a step between a first height and a second height, axes of the touch molding roll and the main molding roll being positioned at the first height, axes of the finish molding rolls being positioned at the second height.

The multi-stage roll type sheet molding apparatus may further comprise a lifting drive device configured to move the finish molding rolls in a vertical direction, thereby enabling adjustment of height positions of the finish molding rolls.

Of the molding rolls, at least the touch molding roll may be configured by an elastic roll.

Of the molding rolls, the touch molding roll and at least one of the molding rolls other than the touch molding roll may be configured by an elastic roll.

DETAILED DESCRIPTION

Next, description is given of illustrative embodiments of a multi-stage roll type sheet molding apparatus of the disclosure with reference to the drawings.

<First Illustrative Embodiment>

[General Description of Sheet Molding Apparatus]

Figure 1:
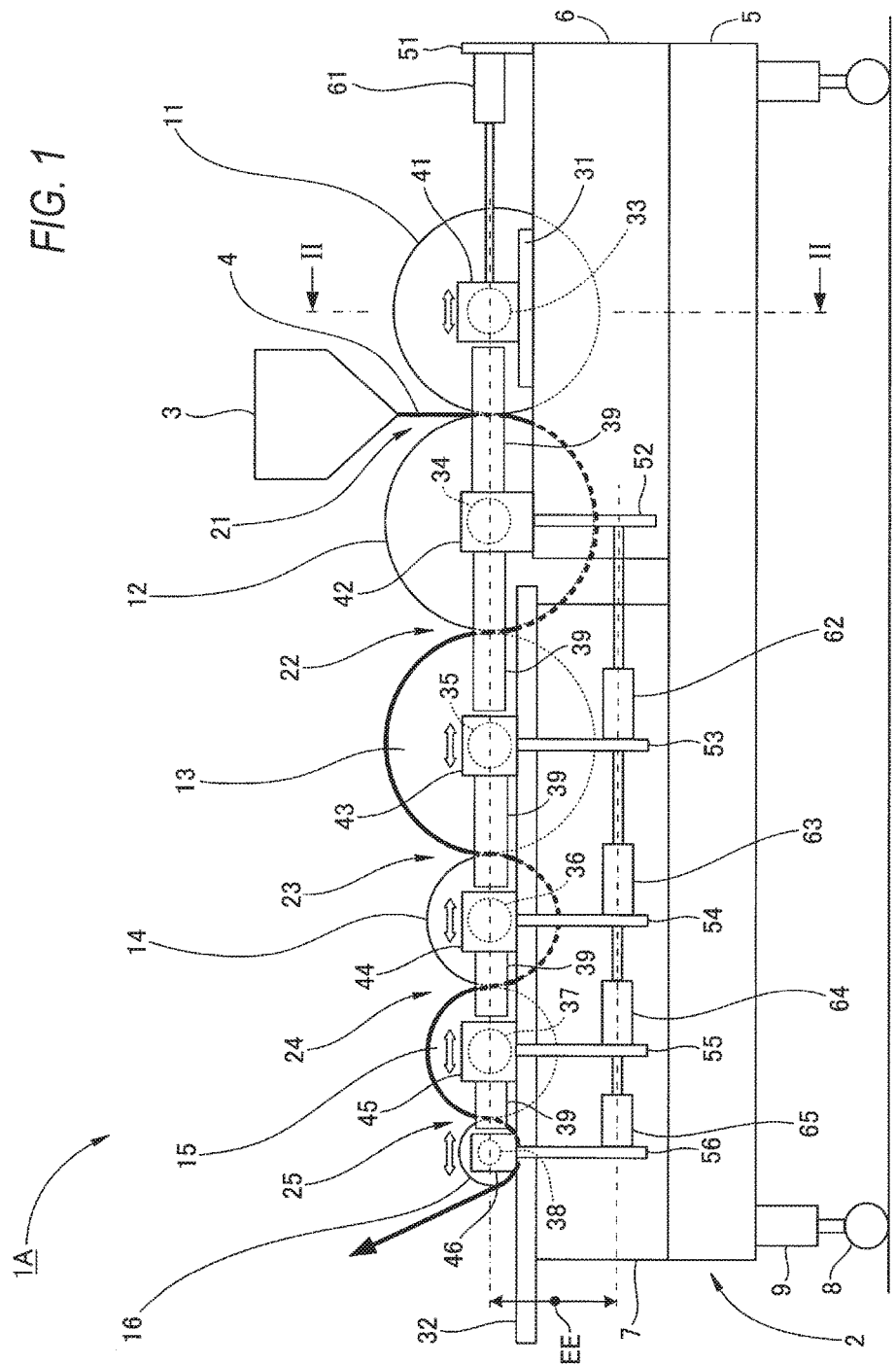
FIG. 1 is a schematic side view of the structure of a multi-stage roll type molding apparatus according to a first illustrative embodiment of the invention.

A multi-stage type roll type sheet molding apparatus 1A shown in FIG. 1 is used to mold, for example, a transparent clear sheet of about 0.1 mm to 3 mm using resin material such as polycarbonate (PC), polymethylmethacrylate (PMMA), polyethyleneterephthalate (PET), polypropylene (PP) and polyethylene (PE) according to a pressure molding method, and can produce a sheet ranging from a thin sheet to a thick sheet at high speeds and with high quality.

The sheet molding apparatus 1A includes: a total of five molding rolls 11 to 15 disposed in parallel to each other sequentially from the front stage side (in FIG. 1, the right side) to the rear stage side (in FIG. 1, the left side) in the horizontal direction, that is, a touch molding roll 11, a main molding roll 12, a first finish molding roll 13, a second finish molding 14 and a third finish molding roll 15; a removing roll 16 disposed in parallel to and on the rear stage side of the third finish molding roll 15; and, a base 2 for supporting the molding rolls 11 to 15 and removing roll 16.

Here, the five molding rolls 11 to 15 and removing roll 16 are set in the same width in the axial direction, while the height positions thereof are set such that the axes of the respective rolls 11 to 16 are on the same horizontal surface.

The touch molding roll 11, main molding roll 12 and first finish molding roll 13 all have a roll outside diameter of 300 mm, the second finish molding 14 and third finish molding roll 15 both have a roll outside diameter of 250 mm, and the molding rolls 11 to 15 all have a surface length of 1400 mm.

[Description of Supply of Molten Sheet]

Above between the touch molding roll 11 and main molding roll 12, there is disposed a T die 3 for pushing out molten resin from a molten resin push-out machine (not shown) downward in a sheet-shaped manner, and a molten sheet 4 pushed out from the T die 3 is supplied to a first nip part 21 (to be discussed later) interposed between the touch molding roll 11 and main molding roll 12.

[Description of Nip Part]

Between the touch molding roll 11 and main molding roll 12, there is formed a first nip part 21 constituted of a gap where a molten sheet 4 from the molding rolls 11 and 12 is held and compressed by these molding rolls 11 and 12.

Between the main molding roll 12 and finish molding roll 13, there is formed a second nip part 22 constituted of a gap where the sheet 4 is held and compressed by these molding rolls 12 and 13.

Similarly, between the first finish molding roll 13 and second finish molding roll 14, between the second finish molding roll 14 and third finish molding roll 15, and between the third finish molding roll 15 and removing roll 16, there are sequentially formed a third nip part 23, a fourth nip part 24 and a fifth nip part 25, respectively.

Sheet molding is executed according to a pressure molding method in which the molding rolls 11 to 15 and the removing roll 16 are normally rotated to have the same peripheral speed and, mainly, in the first to fourth nip parts 21 to 24, the axial-direction whole width areas of the mutually adjacent molding rolls 11, 12; 12, 13; 13, 14; and 14, 15 are allowed to apply uniform pressure (line pressure) to the sheet 4 to thereby mold the sheet 4 into a sheet having a specific thickness.

[Description of Bank]

When molten resin is compressed by the touch molding roll 11 and main molding roll 12 while rotating these rolls, although the specific description thereof is omitted, there are formed a portion where one or both of the surfaces of the resin are swollen on the upstream side of the first nip part 21 (this swelling portion is hereinafter called a bank).

When the bank is excessively large, a bank mark (an irregular horizontal portion) occurs to cause a defective sheet, and when the bank has a proper size, it provides a kneading action, thereby contributing toward homogenization of the sheet.

When molding a thin sheet, the bank normally occurs only in the first nip part 21 and the number of bank occurrence times is one. Meanwhile, when molding a thick sheet, since the thick sheet is slow to cool, banks occur in multiple locations including not only the first nip part 21 but also the second and third nip parts 22 and 23.

Also, in the thin sheet, depending on the kind of resin, when the thickness thereof is 0.4 mm or smaller, it can be cooled quickly and, normally, the number of bank occurrences times is one but, when it is molded at high speeds, the number of bank occurrence times increases.

[Description of Base]

The base 2 includes a base frame 5 extending long in the longitudinal direction (in FIG. 1, in the right and left direction), a pair of front-stage side rail support frames 6 disposed parallel to each other in the right and left direction (a direction to penetrate through the sheet of FIG. 1 perpendicularly) while they are spaced by a specific gap from each other, and a pair of rear-stage side rail support frames 7 disposed parallel to each other in the right and left direction. The rail support frames 6, 7 are fixedly set on the base frame 5 such that the front-stage side rail support frames 6 are situated on the front side and the rear-stage side rail support frames 7 are situated on the rear side.

On the lower surface side of the base 2, in the four corners of the base 2, there are mounted jacks 9 each equipped with a traveling wheel 8, whereby the sheet molding apparatus 1A can be moved easily and, by lifting the whole of the sheet molding apparatus 1A, the vertical height position thereof with respect to, for example, the T die 3 can adjusted easily.

[Description of Roll Support Structure & Guide Means]

On the paired front-stage side rail support frames 6, as guide means extending in the longitudinal direction, there are fixedly disposed a pair of front-stage side rails 31 with a specific gap in the right and left direction between them and, on the paired rear-stage side rail support frames 7, as guide means extending in the longitudinal direction, there are fixedly disposed a pair of rear-stage side rails 32 with a specific gap in the right and left direction between them.

On the both sides of the touch molding roll 11, there are mounted roll bearings 33. A first bearing box 41 for holding the roll bearings 33 is slidably set on the front-stage side rail 31. The touch molding roll 11 is guided horizontally movably in the longitudinal direction through the first bearing box 41 by the front-stage side rail 31.

On the both sides of the main molding roll 12, there are mounted roll bearings 34. A second bearing box 42 for holding the roll bearings 34 is fixedly set on the front-stage side rail support frame 6. The main molding roll 12 is fixed to the front-stage side rail support frame 6 through the second bearing box 42.

On the both sides of the first finish molding roll 13, there are mounted roll bearings 35. A third bearing box 43 for holding the roll bearings 35 is slidably set on the rear stage side rail 32. The first finish molding roll 13 is guided horizontally movably in the longitudinal direction through the third bearing box 43 by the rear stage side rail 32.

On the both sides of the second finish molding roll 14, there are mounted roll bearings 36. A fourth bearing box 44 for holding the roll bearings 36 is slidably set on the rear stage side rail 32. The second finish molding roll 14 is guided horizontally movably in the longitudinal direction through the fourth bearing box 44 by the rear-stage side rail 32.

On the both sides of the third finish molding roll 15, there are mounted roll bearings 37. A fifth bearing box 45 for holding the roll bearings 37 is slidably set on the rear stage side rail 32. The third finish molding roll 15 is guided horizontally movably in the longitudinal direction through the fifth bearing box 45 by the rear-stage side rail 32.

On the both sides of the removing roll 16, there are mounted roll bearings 38. A sixth bearing box 46 for holding the roll bearings 38 is slidably set on the rear stage side rail 32. The removing roll 16 is guided horizontally movably in the longitudinal direction through the sixth bearing box 46 by the rear-stage side rail 32.

[Description of Slide Drive Means for Moving Touch Molding Roll Horizontally]

On the front end of the front stage side rail support frame 6, there is erected a first support member 51 and, between the first support member 51 and first bearing box 41, there is disposed a first hydraulic cylinder 61 serving as slide drive means for moving the touch molding roll 11 horizontally.

The bottom side of the first hydraulic cylinder 61 is fixed to the first support member 51, while the rod side thereof is connected to the first bearing box 41.

When the first hydraulic cylinder 61 is contracted, the touch molding roll 11 is horizontally moved relative to the main molding roll 12 in a direction to part away therefrom, thereby increasing the gap of the first nip part 21; and, reversely, when the first hydraulic cylinder is extended, the touch molding roll 11 is horizontally moved relative to the main molding roll 12 in a direction to approach it, thereby decreasing the gap of the first nip part 21.

Thus, the contraction or extension operation of the first hydraulic cylinder 61 attains a first nip part opening/closing operation for opening or closing the first nip part 21.

[Description of Slide Drive Means for Moving First Finish Molding Roll Horizontally]

On the outer surface of the front stage side rail support frame 6, there is provided a second support member 52 so as to project outward in the right and left direction. On the third bearing box 43, there is provided a third support member 53 projecting outward in the right and left direction and extending downward. Between the second and third support members 52 and 53, there is interposed a second hydraulic cylinder 62 serving as slide drive means for moving the first finish molding roll 13 horizontally.

The bottom side of the second hydraulic cylinder 62 is fixed to the third support member 53, while the rod side thereof is connected to the second support member 52.

When the second hydraulic cylinder 62 is extended, the first finish molding roll 13 is horizontally moved relative to the main molding roll 12 in a direction to part away therefrom, thereby widening the gap of the second nip part 22. Reversely, when the second hydraulic cylinder 62 is contracted, the first finish molding roll 13 is horizontally moved relative to the main molding roll 12 in a direction to approach it, thereby narrowing the gap of the second nip part 22.

Thus, the contraction or extension operation of the second hydraulic cylinder 62 attains a second nip part opening/closing operation for opening or closing the second nip part 22.

[Description of Slide Drive Means for Moving Second Finish Molding Roll Horizontally]

On the fourth bearing box 44, there is provided a fourth support member 54 projecting outward in the right and left direction and extending downward. Between the third and fourth support members 53 and 54, there is interposed a third hydraulic cylinder 63 serving as slide drive means for moving the second finish molding roll 14 horizontally.

The bottom side of the third hydraulic cylinder 63 is fixed to the fourth support member 54, while the rod side thereof is connected to the third support member 53.

When the third hydraulic cylinder 63 is extended, the second finish molding roll 14 is horizontally moved relative to the first finish molding roll 13 in a direction to part away therefrom, thereby widening the gap of the third nip part 23. Reversely, when the third hydraulic cylinder 63 is contracted, the second finish molding roll 14 is horizontally moved relative to the first finish molding roll 13 in a direction to approach it, thereby narrowing the gap of the third nip part 23.

Thus, the contraction or extension operation of the third hydraulic cylinder 63 attains a third nip part opening/closing operation for opening or closing the third nip part 23.

[Description of Slide Drive Means for Moving Third Finish Molding Roll Horizontally]

On the fifth bearing box 45, there is provided a fifth support member 55 projecting outward in the right and left direction and extending downward and, between the fourth and fifth support members 54 and 55, there is interposed a fourth hydraulic cylinder 64 serving as slide drive means for moving the third finish molding roll 15 horizontally.

The bottom side of the fourth hydraulic cylinder 64 is fixed to a fifth support member 55, while the rod side thereof is connected to the fourth support member 54.

When the fourth hydraulic cylinder 64 is extended, the third finish molding roll 15 is moved horizontally relative to the second finish molding roll 14 in a direction to part away therefrom, thereby widening the gap of the fourth nip part 24. Reversely, when the fourth hydraulic cylinder 64 is contracted, the third finish molding roll 15 is moved horizontally relative to the second finish molding roll 14 in a direction to approach it, thereby narrowing the gap of the fourth nip part 24.

Thus, the extension or contraction operation of the fourth hydraulic cylinder 64 attains a fourth nip part opening/closing operation for opening or closing the fourth nip part 24.

[Description of Slide Drive Means for Moving Removing Roll Horizontally]

On the sixth bearing box 46, there is mounted a sixth support member 56 projecting outward in the right and left direction and extending downward and, between the fifth and sixth support members 55 and 56, there is interposed a fifth hydraulic cylinder 65 serving as slide drive means for moving the removing roll 16 horizontally.

The bottom side of the fifth hydraulic cylinder 65 is fixed to the sixth support member 56, while the rod side thereof is connected to the fifth support member 55.

When the fifth hydraulic cylinder 65 is extended, the removing roll 16 is horizontally moved relative to the third finish molding roll 15 in a direction to part away therefrom, thereby widening the gap of the fifth nip part 25. Reversely, when the fifth hydraulic cylinder 65 is contracted, the removing roll 16 is horizontally moved relative to the third finish molding roll 15 in a direction to approach it, thereby narrowing the gap of the fifth nip part 25.

Thus, the extension and contraction operation of the fifth hydraulic cylinder 65 attains a fifth nip part opening/closing operation for opening or closing the fifth nip part 25.

Here, the removing roll 16 has a role which secures the sheet winding angle of the third finish molding roll 15 in 180° to thereby increase the cooling capability thereof and also positively removes the sheet 4 from the third finish molding roll 15. When the removing roll 16 is not provided in the sheet 4 made of an adhesive resin sheet, the sheet removing position can be changed, or the sheet 4 can be fluttered so that a removing mark can be attached to the sheet surface. Thus, preferably, the removing roll 16 may be provided; and, normally, the nip line pressure thereof is set lower than that of the molding rolls to thereby prevent the removing roll 16 from adhering to the sheet.

The second to fifth hydraulic cylinders 62 to 65 are connected in series with their cylinder axes matched to each other so that their axial lines exist on the same straight line.

The cylinder axial lines of the second to fifth hydraulic cylinders 62 to 65 and the line connecting the axes of the roll bearings 35 to 38 are spaced from each other outward in the right and left direction and also in the vertical direction (an eccentric amount shown by a sign EE in FIG. 1). Thus, between the third to sixth bearing boxes 43 to 46 and the rear-stage side rail 32, there is produced bending moment in the second to fifth nip part opening/closing operation. Therefore, a slide structure for the third to sixth bearing boxes 43 to 46 and the rear-stage side rail 32 must be made strong.

For example, although specific description by way of illustration is omitted, there may preferably be employed a structure in which a total of four (two each on front and rear sides) slide linear guides having balls circulating therein are disposed in double lines on the right and left sides for the individual bearing boxes 43 to 46.

In the second to fifth nip part opening/closing operation, the operation oil pressures of the first to fifth hydraulic cylinders 61 to 65 can be adjusted in every individual hydraulic cylinders, and the holding/pressing forces (roll pressing forces (line pressures)) in the first to fifth nip parts 21 to 25 relative to the sheet 4 can be adjusted in every individual nip parts.

[Description of Linkage in Nip Part Opening/Closing Operation and Influence Given to Nip Parts]

The first to third finish molding rolls 13 to 15 and removing roll 16 are dynamically linked with each other by the third to sixth bearing boxes 43 to 46, third to sixth support members 53 to 56 and third to fifth hydraulic cylinders 63 to 65.

Therefore, when the second hydraulic cylinder 62 is extended and contracted to horizontally reciprocate the first finish molding roll 13 in the longitudinal direction relative to the main molding roll 12, that is, when the second nip part opening/closing operation is executed, the first to third finish molding rolls 13 to 15 and the removing roll 16 are horizontally reciprocated integrally in the longitudinal direction.

Also, when the third hydraulic cylinder 63 is extended and contracted to horizontally reciprocate the second finish molding roll 14 in the longitudinal direction relative to the first finish molding roll 13, that is, when the third nip part opening/closing operation is executed, the second and third finish molding rolls 14, 15 and the removing roll 16 are horizontally reciprocated integrally in the longitudinal direction.

In this case, since the longitudinal-direction horizontal relative positions of the main molding roll 12 and first finish molding roll 13 are held by the second hydraulic cylinder 62, the second nip part 22 is not influenced by the third nip part opening/closing operation.

Also, when the fourth hydraulic cylinder 64 is extended and contracted to horizontally reciprocate the third finish molding roll 15 in the longitudinal direction relative to the second finish molding roll 14, that is, when the fourth nip part opening/closing operation is executed, the third finish molding roll 15 and removing roll 16 are integrally reciprocated horizontally in the longitudinal direction.

In this case, since the longitudinal-direction horizontal relative positions of the first and second finish molding rolls 13 and 14 are held by the third hydraulic cylinder 63, the third nip part 23 is not influenced by the fourth nip part opening/closing operation.

Also, when the fifth hydraulic cylinder 65 is extended and contracted to horizontally reciprocate the removing roll 16 in the longitudinal direction relative to the third molding roll 15, that is, the fifth nip part opening/closing operation is executed, only the removing roll 16 is horizontally reciprocated in the longitudinal direction.

In this case, since the longitudinal-direction horizontal relative positions of the second and third finish molding rolls 14 and 15 are held by the fourth hydraulic cylinder 64, the fourth nip part 24 is not influenced by the fifth nip part opening/closing operation.

[Description of Cotter Device]

Between the first and second bearing boxes 41 and 42, between the second and third bearing boxes 42 and 43, between the third and fourth bearing boxes 43 and 44, between the fourth and fifth bearing boxes 44 and 45, and between the fifth and sixth bearing boxes 45 and 46, there are provided cotter devices 39 which adjust the roll gaps to prevent the respective roll outer peripheral surfaces from contacting with each other and to prevent a thick sheet from being excessively pressed against such surfaces to produce excessively large banks.

As the cotter device 39, although the specific description thereof using illustration is omitted, for example, there is employed a device structured to be able to adjust the roll gaps by putting a wedge-shaped plate into and out of the roll gaps by screwing the plate.

Since the second to fifth hydraulic cylinders 62 to 65 are disposed such that the cylinder axial lines of the second to fifth hydraulic cylinders 62 to 65 are spaced outward in the right and left direction and also in the vertical direction (an eccentric amount EE) from the straight line connecting together the axes of the roll bearings 34 to 38, the cylinders can be positively prevented from interfering with the cotter devices 39.

Next, description is given of the structure of the touch molding roll 11.

Figure 2:
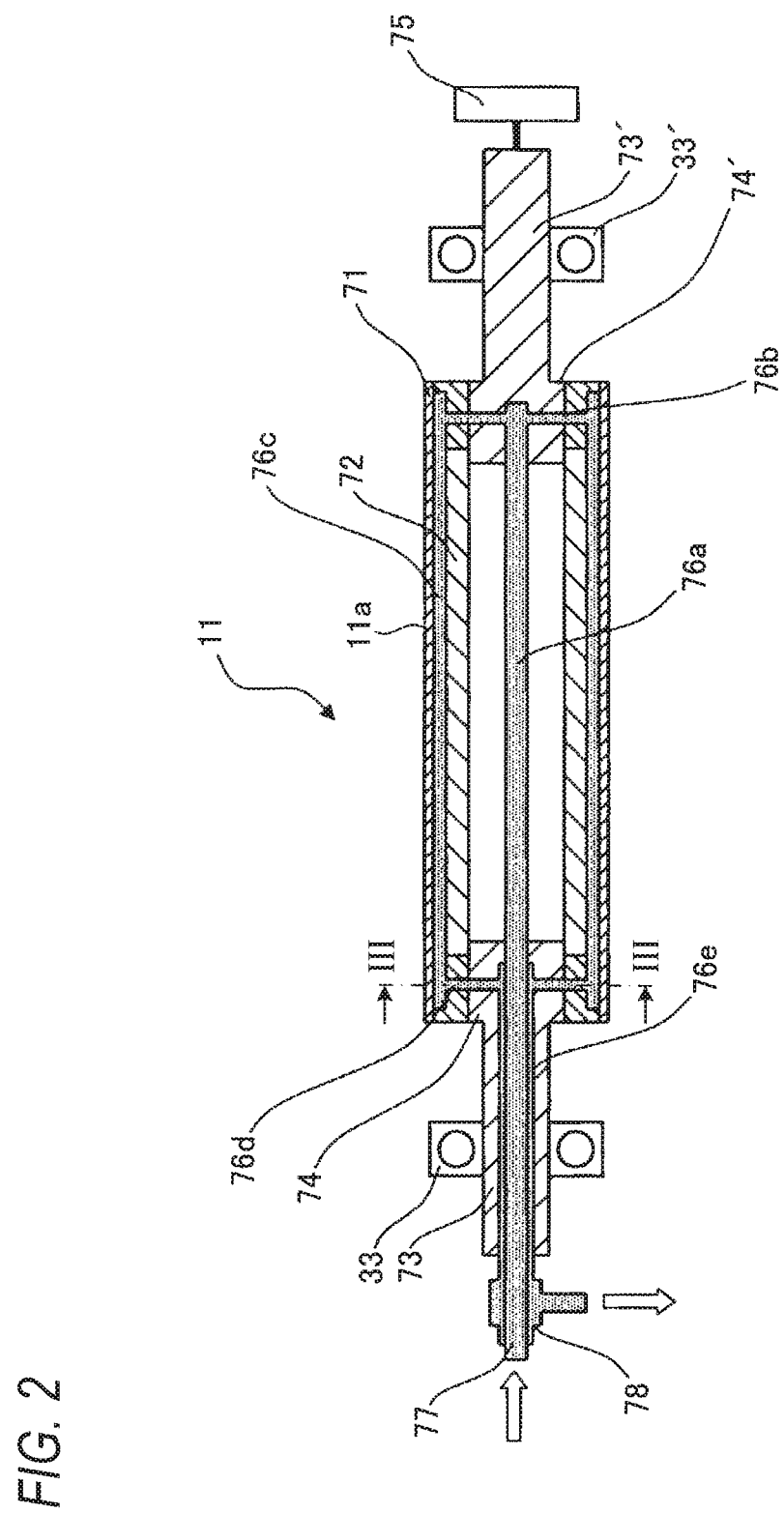
FIG. 2 is an internal structure explanatory view of a touch molding roll, illustrating a section taken along the II-II arrow shown in FIG. 1.

FIG. 2 is a section view (a section view taken along the A-A arrow shown in FIG. 1) of the touch molding roll 11 when it is cut by a plane passing though the axis thereof.

[Description of Elastic Roll]

As shown in FIG. 2, the touch molding roll 11 has a double tube roll structure which includes a cylindrical-shaped outer cell 71 made of an elastic thin metal member having a female screw-shaped groove (not shown) in the inner peripheral surface thereof and an inner cell 72 having an outside diameter smaller than the inside diameter of the outer cell 71, while the inner cell 72 is formed thicker than the outer cell 71 in order to maintain the rigidity of the whole structure.

The touch molding roll 11 is enhanced in the width-direction flexibility due to employment of the thin outer cell 71 with the female screw-shaped groove in the inner peripheral surface, has such flexibility that enables the outer cell 71 to be flexed by a load applied when molding the sheet 4, and can be flexibly deformed according to variable thicknesses occurring in the sheet ear part of the end of the sheet 4 the thickness of which is increased, thereby providing a so-called "elastic roll".

In the touch molding part 11, flexibility is different between the sheet flow direction and the direction perpendicular thereto (sheet width direction), specifically, the flexibility in the sheet width direction is particularly large, whereby contact performance between the sheet 4 and roll surface is enhanced to thereby be able to secure sheet contact performance uniform in the sheet width direction and uniform sheet cooling performance.

In molding a thin sheet, the sheet ear parts of the both ends of the sheet are thickened due to neck-in, and, in molding a sheet 4 having a thickness of 0.5 mm or less, the thickness of the sheet ear parts can be about double the sheet remaining parts.

In this case, when using a rigid roll hardly to be flexed by a load applied when molding the sheet 4, only the sheet ear parts are compressed by the roll, whereby the sheet central part lacks holding/pressing pressure.

Meanwhile, when using an elastic roll represented by the touch molding roll 11, since the outer cell 71 is flexed by the load applied when molding the sheet 4, the roll can flexibly cope with variations in the thickness of the sheet 4, whereby it can hold/press the whole sheet including the sheet ear parts and sheet central part uniformly.

Here, due to the effect of the groove formed in the inner peripheral surface of the outer cell 71, even when the outer cell thickness (t) is 0.06 times the roll radius (R), sufficient elasticity can be obtained.

Therefore, an elastic roll is defined as a roll the outer cell thickness (t) of which is 0.06 times the roll radius (R) or less (t/R≤0.06 (6%)).

In the touch molding roll 11, flanges 74, 74' are formed integrally with the base ends of roll shaft parts 73, 73' respectively projected toward both sides from a roll main body 11a, and the outer cell 71 and inner cell 72 are respectively welded to the flanges 74, 74' and are rotatably supported by roll bearings 33, 33' mounted on the roll shaft parts 73, 73'.

To the roll shaft part 73' which is one of the two roll shaft parts 73, 73' disposed on the both sides of the touch molding roll 11, there is connected a motor 75 in a power transmittable manner, and the touch molding roll 11 is driven into rotation at a specific speed by operating the motor 75 (this rotation drive structure applies similarly to the other molding rolls 12 to 15 and the removing roll 16).

Here, in the touch molding roll 11, the side to which the motor 75 is connected is defined as a drive side, whereas the side situated on the opposite side of the drive side is defined as an operation side.

In the touch molding roll 11, a space between the outer and inner cells 71 and 72 constitutes a passage 76c through which temperature control liquid 77 flows.

Since a female screw-shaped groove is formed in the inner peripheral surface of the outer cell 71, for example, when the temperature control liquid 77 is cooling water serving as a cooling medium, the contact area of such surface with the cooling water is large, thereby enabling enhancement in cooling capability.

Here, although specific description using illustration is omitted, in a space between the outer and inner cells 71 and 72, there is disposed a spiral plate structured such that it is wound around the inner cell 72 in a multi-screw manner, whereby the temperature control liquid 77 is allowed to flow at high speeds.

The roll shaft part 73 on the operation side includes a passage 76a for flow of the temperature control liquid 77 and a passage 76e around the passage 76a.

The passage 76a extends from the operation-side roll shaft part 73 through the center of the touch molding roll 11 to the drive-side roll shaft part 73'.

Also, the drive-side flange 74' includes a passage 76b for bringing the passages 76a and 76c into communication with each other, while the operation-side flange 74 includes a passage 76d for bringing the passages 76c and 76e into communication with each other.

Figure 3:
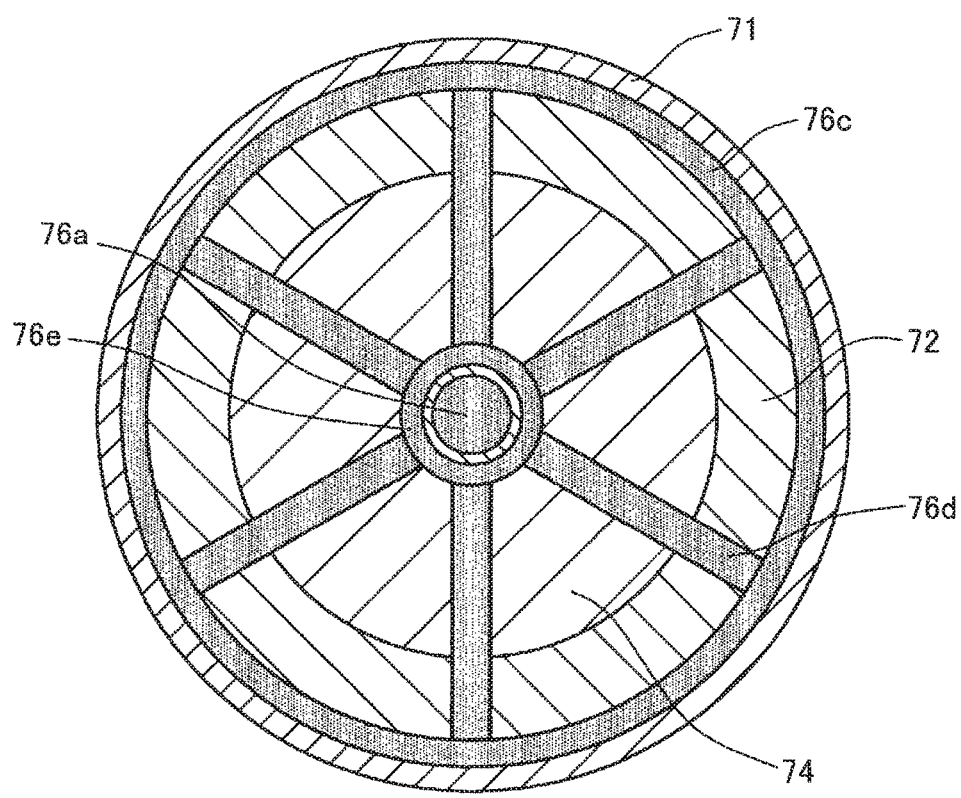
FIG. 3 is a section view taken along the arrow shown in FIG. 2.

FIG. 3 is a section view (taken along the B-B arrow shown in FIG. 2) of the touch molding roll 11, when cut by a plane existing in parallel to the operation-side flange 74 and passing through the center of the passage 76d.

As shown in FIG. 3, in the operation-side flange 74 and inner cell 72, there are formed six passages 76d which extend from the center of the flange 74 toward the outer periphery and are disposed at intervals of equal angle in the peripheral direction, while the passages 76c and 76e are allowed to communicate with each other by the passages 76d.

Here, in the drive-side flange 74' and inner cell 72 as well, although description using such specific illustration as shown in FIG. 3 is omitted, there is employed a similar structure to the above structure, in which the passages 76c and 76a are allowed to communicate with each other by six passages 76b.

The temperature control of the outer periphery of the touch molding roll 11 is attained by circulating the temperature control liquid 77 flowing through the passage 76c.

As the temperature control liquid 77, there is used, for example, cold water and warm water and the flow amount thereof is controlled in order to set the outer periphery of the touch molding roll 11 at a desired temperature.

As shown in FIG. 2, in the circulation of the temperature control liquid 77, firstly, it is brought in from outside by a rotary joint 78 mounted on the operation-side roll shaft part 73.

The brought-in temperature control liquid 77 is allowed to flow to the drive-side roll shaft part 73' by the passage 76a formed in the center of the touch molding roll 11, then the liquid flows through the passage 76b to the passage 76c, and flows along the inner peripheral surface of the outer cell 71 from the drive side toward the operation side.

And, the temperature control liquid 77 flowing toward the operation side is discharged from the passage 76d through the passage 76e to the outside.

The temperature control liquid 77 discharged to the outside is introduced into a temperature control apparatus (not shown) having a function to keep constant the temperature of the temperature control liquid 77.

Here, besides the elastic roll employed in the touch molding roll 11, there can also be used an elastic roll structured such that an outer cell has a small thickness, the ratio of the thickness T of the outer cell and the radius R of the roll outer shape is 0.03≤T/R, and the outer peripheral surface is metal-mirror-surface chrome-plated, and further an elastic roll structured such that a back-up rubber roll with the axis thereof shifted is built in the interior of an outer cylindrical sleeve roll having a small thickness.

In the first illustrative embodiment, when the touch molding roll 11 is made of the above-mentioned elastic roll and the first to third finish molding rolls 11 to 15 are also made of elastic rolls (the main molding roll 12 is made of a rigid roll), the respective nip parts 21 to 25 can increase the sheet contact area with respect to the sheet 4 which is transformed from the molten state to a state where it hardens at temperatures near to normal temperatures, thereby preventing the seat pressure shortage. Thus, there can be provided a structure more suitable for molding the sheet 4 into a sheet having a uniform thickness.

While the sheet 4 is thinned, depending on the kinds of resin, for example, in a sheet made of polypropylene (PP), when the thickness thereof is 0.6 mm or less, the thickness of the sheet ear part increases, whereby the ear part becomes thick. For reference, in a sheet made of polyethyleneterephthalate (PET), when the thickness thereof is 0.4 mm or less, the thickness of the sheet ear part increases, whereby the ear part becomes thick.

In the respective nip parts 21 to 25, when the molding rolls 11 to 15 lack flexibility, the contact performance between the sheet 4 and roll surfaces is impaired, whereby uneven cooling portions are produced in the width-direction cooling.

Thus, when molding a sheet having a thickness of 0.6 mm or less, it is effective to use a flexible elastic roll.

This also means that, when molding a sheet having a thickness of 0.6 mm or more, a rigid roll easy to manufacture can be used sufficiently effectively.

Also, depending on the kinds of resin, even when molding a sheet having a thickness of 0.4 mm, a rigid roll easy to manufacture is sufficiently effective.

In the nip parts 21 to 25, a rigid roll and an elastic roll may be used in combination, or, two elastic rolls may be used in combination.

When the flexibility of the former combination is 1, in the latter combination (both rolls are elastic rolls), since the rolls act on both surfaces of the sheet, the flexibility of the rolls applied to the sheet 4 in the nip parts 21 to 25 is double.

This means that, in the latter combination case, the outer cell 71 may be formed slightly larger in thickness.

An elastic roll represented by the touch molding roll 11 enables flow of the temperature control liquid 77 between the outer and inner cells 71 and 72, and the outer and inner cells 71 and 72 are made of metal. Thus, the elastic roll is a roll having high cooling/heating capability.

Also, since the female screw-shaped groove is formed in the inner peripheral surface of the outer cell 71, the contact area thereof with the temperature control liquid 77 in the interior of the roll is large, whereby the roll cooling/heating capability is high.

Since, due to the groove of the outer cell 71, the width-direction flexibility of the outer cell increases and, particularly, the outer cell can be flexibly deformed with respect to variations in the thickness around the ear part of the sheet, whereby contact between the sheet 4 and roll surfaces is enhanced, the cooling performance in the width direction is uniformed, and the roll cooling capability is enhanced.

Here, there may also be employed a roll structure in which, in the outer cell 71, grooves are formed only in the inner peripheral surfaces of the both ends of the roll main body 11a to be contacted with the sheet ear parts; or, a roll structure in which the shapes of the grooves are partially changed so as to obtain higher flexibility, thereby reinforcing the function of the roll.

[Description of Molding Operation of Sheet Molding Apparatus]

In the above-structured sheet molding apparatus 1A, molding of the sheet 4 is attained as follows.

As shown in FIG. 1, firstly, molten resin from a molten resin extruder (not shown) is extruded downward from above in a sheet-shaped manner by the T die 3 toward space between the touch molding roll 11 and main molding roll 12, and is introduced to the first nip part 21.

Next, the molten sheet 4 introduced to the first nip part 21 is compressed by the touch molding roll 11 and main molding roll 12, the compressed sheet 4 is fed from the main molding roll 12 to the first to third finish molding rolls 13 to 15 and removing roll 16 sequentially while winding it around the rolls, nip operations are performed on the sheet 4 in the second to fifth nip parts 22 to 25 successively, and pressure uniform in the roll width direction is applied to the sheet 4 from the second to fifth molding rolls 12 to 15 and the removing roll 16, thereby molding the sheet 4 into a specific thickness.

After the sheet 4 cooled by the molding rolls 11 to 15 is removed from the third finish molding roll 15 by the removing roll 16, the sheet 4 is passed in the air and is cooled by auxiliary rolls (not shown), and is wound by a winder or is cut, thereby providing a product sheet.

[Description of Effect of Large Diameter of Molding Roll]

The touch molding roll 11, main molding roll 12 and first finish molding roll 13 respectively have a relatively large roll diameter larger than a normal diameter of 300 mm.

In an ordinary rigid double-sided touch molding roll, the diameter of the roll external shape thereof is in the range of 200 mm to 600 mm (roll surface length is in the range of 1200 mm to 5000 mm), and 300 mm (diameter)×1400 mm (length) can be regarded as a normal range.

An example of disposal of the roll in the sheet molding apparatus 1A shown in FIG. 1 is suitable for molding a thick sheet (for example, a sheet having a thickness dimension t=0.6 to several mm).

Generally, in molding a sheet, when nipping/cooling operations are repeatedly performed uniformly on the front and back surfaces of the sheet, there is provided an effect that the quality of the sheet can be enhanced and the molding speed can be increased.

[Description of Expression of Large Diameter & Small Diameter of Roll Diameter]

(Large Diameter Cast Molding)

Referring to the expression "large diameter" for a molding roll, for example, a cast roll having a diameter of 1500 mm means a large diameter cast roll and it is generally called a cast; and, in most cases, in one time winding on a sheet, the cast cools the sheet from one side thereof, while the other side is cooled by soaking it in the water of a water tank.

Also, in the large diameter cast, there is hardly used the double-sided touch that is performed in combination with a touch molding roll.

A sheet having a thickness of several mm, in some cases, is molded at high speeds (for example, 80 m/min) in such a manner that two sets of such large diameter casts and rolls with the outer peripheral surfaces cooled in water are combined in series.

In most cases, in the later step, the sheet is stretched in the vertical and horizontal directions to thin the sheet, thereby producing a stretched film.

(Non-Stretch Double-Sided Touch Molding (Smaller in Diameter than Cast))

Referring to the expression "small diameter" for a molding roll, for example, the expression means a roll diameter of 600 mm or less (200 mm to 600 mm). By touch-pressure molding the both surfaces of a sheet, a clear sheet having glossy dual sides or a satin pattern sheet is molded. Normally, two or three molding rolls are used.

In most cases, in the later step, the sheet is passed in the air, is cooled by an auxiliary roll and wound by a winder, thereby providing a product sheet as it is (stretching is not performed).

In the sheet molding apparatus 1A of the first illustrative embodiment, in order to prevent the bank from becoming excessively large when molding a thick sheet, the molding rolls 11 to 13 having a relatively large diameter are combined with each other.

Since the thick sheet is slow to cool, a long cooling surface is necessary and, in the thick sheet, banks in the first nip part 21 and so on are easy to become large.

Therefore, for the thick sheet, the molding rolls 11 to 13 having a relatively large diameter may preferably be combined together.

When the thick sheet is double-side cooled by the molding rolls 11 to 15 disposed in multiple stages, the cooling speed becomes remarkably fast, which is discussed below specifically.

[Description of Comparison Between Sheet Double-Side Cooling and One-Side Cooling]

Figure 4A:
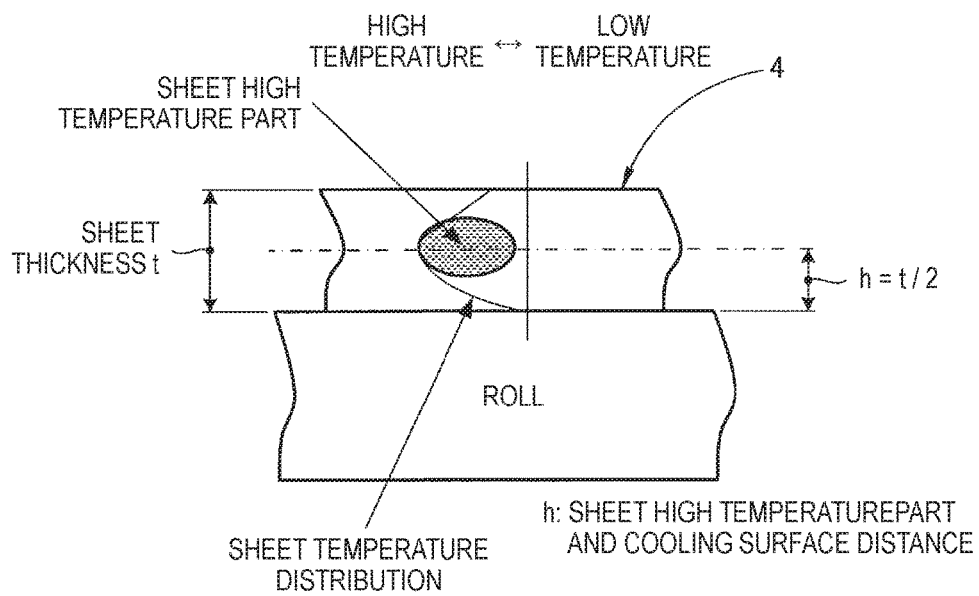
FIGS. 4A and 4B are explanatory views of comparison between sheet both-side cooling and one-side cooling.

Since the sheet molding apparatus 1A of the first illustrative embodiment molds a sheet at high speeds using the molding rolls 11 to 15 disposed in multiple stages, it can produce banks in many nip parts, the contact cooling distance between the sheet 4 and molding rolls 11 to 15 is long, and the both surfaces of the sheet are repeatedly cooled alternately by the molding rolls 11 to 15 (which corresponds to the double-side cooling shown in FIG. 4A).

Figure 4B:
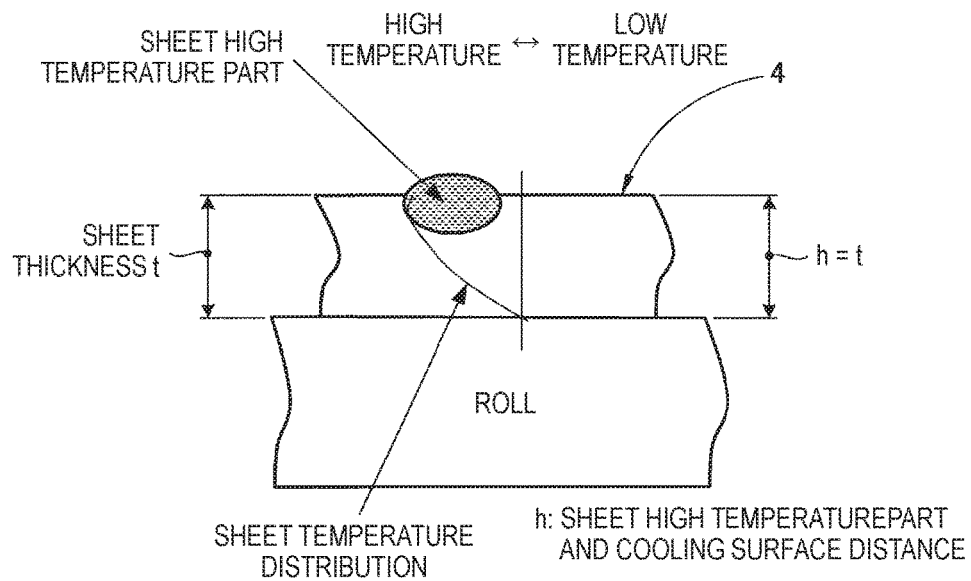
Figure 11A:
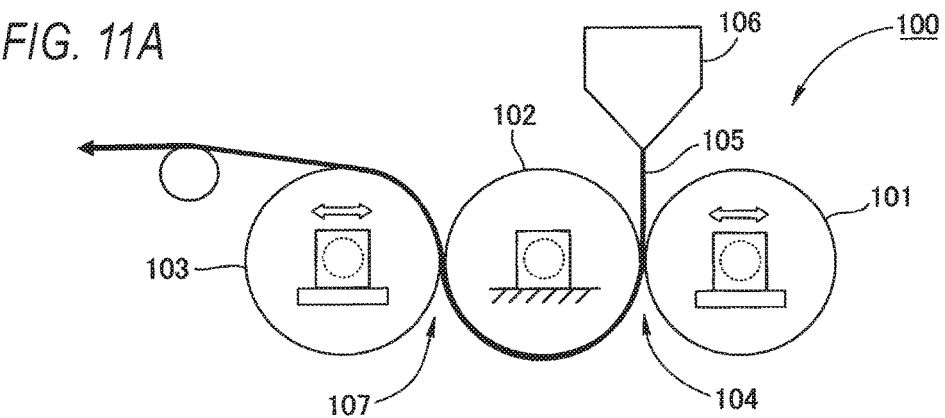
FIGS. 11A to 11C are explanatory views of a related-art sheet molding apparatus.
Figure 11B:
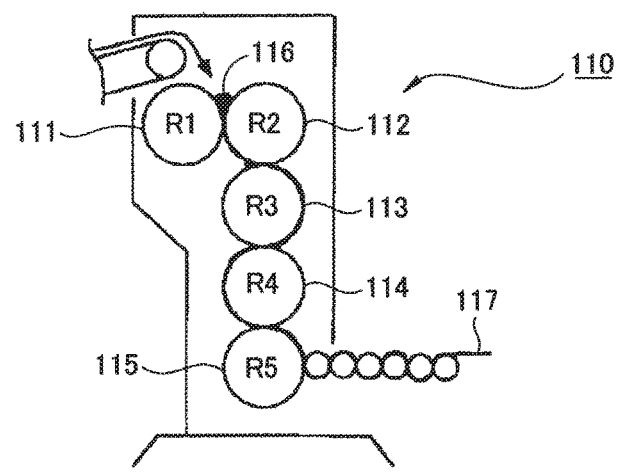

As shown in FIG. 4B, when the sheet 105 is cooled by the related-art large-diameter molding rolls 101, 102, 103 (see FIG. 11A), the sheet high temperature part is distributed unevenly in the sheet surface on the air layer side.

The reason for this is as follows. While cooling from the air layer is little, in cooling by the large-diameter molding rolls, since the roll contact area is long and the roll surface contact thermal conductivity is high, the high temperature part of the central part in the sheet thickness direction moves slowly to the sheet both surfaces, whereby the roll side of the sheet is cooled but the air side thereof is left in high temperatures. Thus, the cooling by the large-diameter molding rolls corresponds to one-side cooling.

Here, when the heat transfer coefficient of iron used as a roll material is compared with that of the air, as shown in Table 1, the former is as large as 2300 times the latter.

TABLE 1

| Roll Cell Iron Material Heat Transfer Coefficient | 46 | Kcal/mhr° C. | 2300 (ratio to air) |
|---|---|---|---|
| Molten Resin PET Heat Transfer Coefficient | 0.2 | Kcal/mhr° C. | 10 (ratio to air) |
| Air Heat Transfer Coefficient | 0.02 | Kcal/mhr° C. | 1 |

Also, the contact heat transmission between the sheet surface and roll surface is influenced by a thin air layer interposed between them and the variable flow speed of the boundary layer. However, even with such influence taken into consideration, when the roll and air sides of the sheet are compared with respect to the actual heat transfer amount and cooling capability, the sheet roll side is as large as about 50 times the sheet air side.

This means that most of cooling is carried out from the sheet roll side.

Also, since the heat transfer coefficient is low, heat transfer in the interior of the resin sheet is slow. Thus, a thick sheet is slow to cool.

In cooling by the touch molding roll 11, main molding roll 12 and first to third finish molding rolls 13 to 15 (which is hereinafter called "multi-stage roll cooling"), since the sheet both surfaces are repeatedly cooled, the high temperature part of the sheet 4 exists in the central part in the thickness direction of the sheet 4.

Meanwhile, in the related-art large-diameter molding roll cooling, as described above, since the roll contact area is long and the roll surface contact heat conductivity is high, cooling is substantially carried out from one side, whereby the sheet high temperature part exists unevenly near to the surface of the sheet to be contacted with the air layer.

Therefore, as shown in FIGS. 4A and 4B, where the distance from the sheet high temperature part to the roll cooling surface is expressed by h, the distance h of the double-side cooling is two times the distance h of the one-side cooling in an infinite cooling length. Thus, the double-side cooling provides an effect that it has the same cooling capability as the cooling capability to be provided when the sheet thickness is reduced by half.

Figure 5:
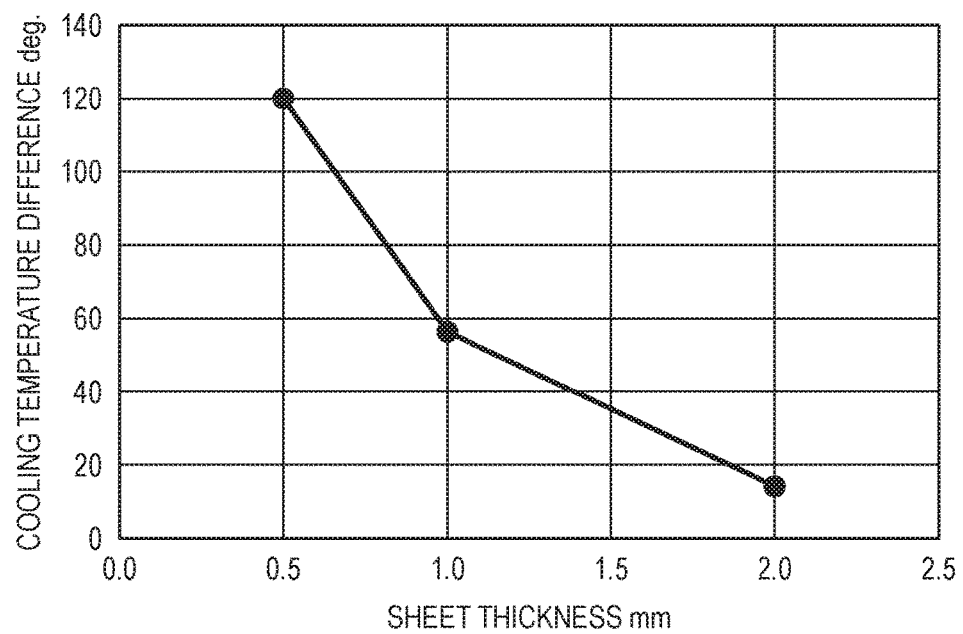
FIG. 5 is a graph of the relationship between sheet cooling temperature differences and sheet thicknesses in sheet one-side cooling time.

A graph of FIG. 5 shows the relationship between the sheet cooling temperature differences and sheet thicknesses in one-side cooling when they are simulated under the following calculation conditions (1) to (5).

[Calculation Conditions]
(1) Prior-to-cooling resin sheet: PET 250° C.
(2) Cooling time: 2 sec.
(3) Roll cooling surface: Iron-plated mirror surface 20° C.
(4) Speed: 20 m/min or less
(5) Outside air temperature: 20° C.

In the above calculation simulation, 2 sec. after a sheet is embraced by a roll surface, the sheet center cooling temperature differences are calculated, where the sheet thickness includes three kinds, that is, 0.5 mm, 1 mm and 2 mm, the resin temperature is 250° C., and the resin kind is PET.

Also, one side is the air surface of 20° C., and the sheet speed is 20, 10 and 5 m/min sequentially according to the sheet thickness starting from the thinnest.

As can be seen clearly from the graph of FIG. 5, the thinner the thickness of the sheet is, the faster the sheet is cooled, and thus the cooling temperature differences are substantially inversely proportional to the sheet thicknesses; and, specifically, a thick sheet having a thickness of about 2 mm is particularly slow to cool.

As shown in FIG. 4B, in the one-side cooling, the side of the sheet to be contacted with the air layer provides the highest temperature; and, as shown in FIG. 4A, in the double-side cooling, the center of the sheet provides the highest temperature. For example, even in the above thick sheet having a thickness of 2 mm, actually, the cooling speed thereof substantially corresponds to that of a thin sheet and thus the cooling speed of the thick sheet is quickened.

As a result, the cooling speed of a thick sheet having a thickness of 1 to 2 mm or more, in double-side cooling, provides the cooling speed of a sheet having a thickness about half of such thickness, thereby showing that the cooling speed is remarkably improved and thus showing that the improvement of the cooling speed in the multi-stage roll cooling is particularly effective.

In the sheet molding apparatus 1A of the first illustrative embodiment, the diameters of the touch molding roll 11, main molding roll 12 and first finish molding roll 13, as described above, are all 300 mm.

While the sheet molding apparatus 1A is suitably used to mold a thick sheet, for example, even in a thin sheet of 0.6 mm or less, depending on the molding feed speed, the number of banks produced in the nip parts 21 to 25 is 2 or more.

Even the second nip part 22 has a resin temperature of 150° C., and resin such as PET or PP is in a molten state (the temperature thereof is a crystallization temperature or higher), thereby producing banks; and further, when the thickness increases, the bank production locations increases, thereby providing multiple banks.

Particularly, the resin in the counter-roll side surface providing the side to be contacted with the air layer keeps higher temperatures; and, depending on the roll peripheral speed (sheet speed) and sheet thickness, in the case of a PP sheet having a thickness of 0.6 mm, at a speed of 20 m/min or so, bank formation is confirmed even in the second nip part 22.

The higher the roll peripheral speed (sheet speed) is, the slower the temperature cooling is, thereby increasing the number of banks.

Since the multi-stage cooling corresponds to double-side cooling and thus the cooling speed is increased, the operation of the apparatus is necessarily performed at high speeds.

Also, the results show that, with respect to the quality of the molded sheet, when compared with the related-art technology, for example, the transparency of the PP sheet is excellent and the gloss of the surface is also excellent.

[Description of Air Block Effect in Multi-Stage Roll Nips]

The sheet molding apparatus 1A of the first illustrative embodiment shown in FIG. 1 is characterized in that the apparatus drives the touch molding roll 11, the main molding roll 12 and the first to third finish molding rolls 13 to 15, that is, four or more molding rolls 11 to 15 to perform nip operations successively on the sheet 4. In this manner, since, using many molding rolls 11 to 15, the nip operations are performed successively in multiple stages, no air layer is provided between the roll surfaces and sheet 4, thereby enabling enhancement in roll cooling efficiency.

When compared with the related-art sheet molding apparatus 100 (see FIG. 1A) using the three molding rolls 101, 102 and 103, interposition of the air layer between the roll surfaces and the sheet 4 can be reduced remarkably.

Since the heat transfer coefficient of the air layer, as described above, is as large as 2300 times that of iron, even the air layer having a thickness of 10 µm corresponds to the thermal resistance of an iron material having a thickness of 23 mm and thus provides a large heat insulating layer. However, since entrapment of such air layer is blocked by the multi-stage successive nip operations using many molding rolls 11 to 15, high cooling performance can be obtained.

[Description of Thin Sheet Molding by Horizontal Multi-Stage Roll Disposal]

Cooling speed of a thin sheet having a thickness of 0.6 mm or less by the touch molding roll 11 and the main molding roll 12 is fast and thus the sheet both surfaces need be contacted with the touch molding roll 11 and the main molding roll 12 simultaneously.

As shown in FIG. 1, in the sheet molding apparatus 1A of the first illustrative embodiment, the T die 3 extrudes the molten sheet 4 downward, and the touch molding roll 11 and main molding roll 12 disposed horizontally parallel to each other below the T die 3 receive the molten sheet 4 extruded down from the T die 3 while holding the sheet between them. Thus, even in a thin sheet, nip operations are performed so as to bring the two molding rolls 11 and 12 into contact with the sheet simultaneously, thereby enabling molding of the sheet.

Also, monitoring of bank formation and, when dropping the molten sheet 4 into the first nip part 21, application of an angle to the sheet 4 can be facilitated, thereby enabling control of the bank generating surface.

Figure 11C:
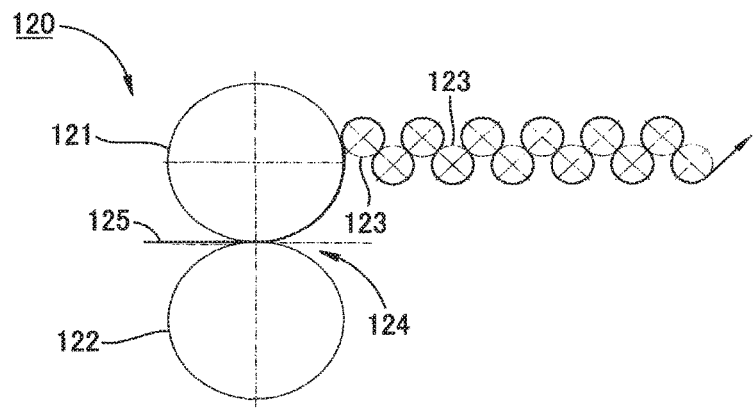

In such structure as disclosed in the sheet molding apparatus 120 (see FIG. 11C) of the U.S. Pat. No. 8,262,966 in which a molten sheet is supplied from lateral direction, the molten sheet hangs down due to gravity and cooling starts first from one side of the sheet to be contacted with the second roll 122, thereby disabling uniform cooling of the both surfaces thereof. Thus, a thin sheet is hard to be molded and bank formation is hard to monitor.

[Advantages]

In the sheet molding apparatus 1A of the first illustrative embodiment shown in FIG. 1, the number of molding rolls 11 to 15 used to mold the sheet 4 is five which is more than four, while, in the related-art sheet molding apparatus 100 (see FIG. 11A), the number of molding rolls used is three.

Thus, the cooling distance of the sheet 4 by the molding rolls 11 to 15 can be increased.

Also, in the first to fifth nip parts 21 to 25 which are more in number than those of the related-art sheet molding apparatus 100, nip operations are performed successively.

Thus, since the molding rolls 11 to 15 and sheet 4 can be closely contacted with each other without an air layer interposed between them, the heat of the sheet 4 is easy to be transmitted to the molding rolls 11 to 15, thereby enabling enhancement in cooling efficiency.

Also, the number of cooling times on the surface side of the sheet 4 by the molding rolls 11 to 15 is two and the number of cooling times on the back side is three. When compared with the related-art sheet molding apparatus 100 in which the number of cooling times on the surface side of the sheet 100 is one and the number of cooling times on the back surface side thereof is two, the number of cooling repetition times on the both surfaces of the sheet 4 can be increased, whereby the total roll contact times of the molding rolls 11 to 15 with the front and back surfaces of the sheet 4 can be made substantially equal to each other.

Thus, the high temperature part of the sheet 4 is caused to exist in the center thereof in the thickness direction, whereby the substantial sheet thickness of the sheet 4 can be converted to the thickness of a thin sheet having a thickness half of the thickness of the sheet 4 in one side cooling.

Therefore, according to the sheet molding apparatus 1A of the first illustrative embodiment, since the contact cooling distance between the molding rolls 11 to 15 and sheet 4 can be increased more than the related-art sheet molding apparatus 100 (see FIG. 11A) and the both surfaces of the sheet 4 can be cooled uniformly, the total cooling capability can be enhanced remarkably; and, since the gloss and transparency of the sheet surface can be enhanced by three or more times of nip operations which are more than the related-art sheet molding apparatus 100, even a thick sheet slow to cool (for example, a sheet having a thickness dimension t=0.6 mm or more) can be molded at high speeds and with high quality.

Also, in the sheet molding apparatus 1A of the first illustrative embodiment, the molten sheet 4 is supplied downward from above to the first nip part 21 between the touch molding roll 11 and main molding roll 12 and is compressed by the touch molding roll 11 and main molding roll 12.

Since a thin sheet (for example, a sheet having a thickness dimension t=0.1 to 0.6 mm or less) is quick to cool, for uniform cooling, it is important to bring the sheet both surfaces into contact with the touch molding roll 11 and main molding roll 12 simultaneously. Employment of the above-mentioned molten sheet supply method enables simultaneous and stable contact of the sheet both surfaces with the touch molding roll 11 and main molding roll 12.

Also, even when the speed of the apparatus 1A is increased more than the related-art sheet molding apparatus 100 (see FIG. 11A), the gloss and transparency of the sheet surface can be enhanced by three or more times of nip operations which are more than that in the related-art sheet molding apparatus 100.

Therefore, even a thin sheet quick to cool can be molded at high speeds and with high quality.

Also, since the resin material passes through the first to fifth nip parts 21 to 25 in a state where the resin material is at high temperatures and soft, the sheet both surfaces can obtain a uniform heat history, the crystallization, residual stress or the like of the sheet both surfaces are uniform, curl, deformation or the like after cooled occur hardly, and the sheet both surfaces provide uniform properties.

According to the above molten sheet supply method, advantageously, by lifting and lowering the jack 9 mounted on the base 2, the height-direction relative distance between the first nip part 21 and T die 3 can be adjusted and, in a state where the touch molding roll 11 and main molding roll 12 are separated from each other and the first nip part 21 is released, the molten sheet 4 can be supplied from the T die 3 to the first nip part 21, thereby enabling reduction in the operation time to the nip operation and sheet molding start.

Also, it is easy to operate and control the operation conditions such as the sheet molding movement during sheet molding operation, check of the bank size and the existence or presence of banks, and adjustment of the air gap (the distance from the T die 3 to the first nip part 21).

<Second Illustrative Embodiment>

Figure 6:
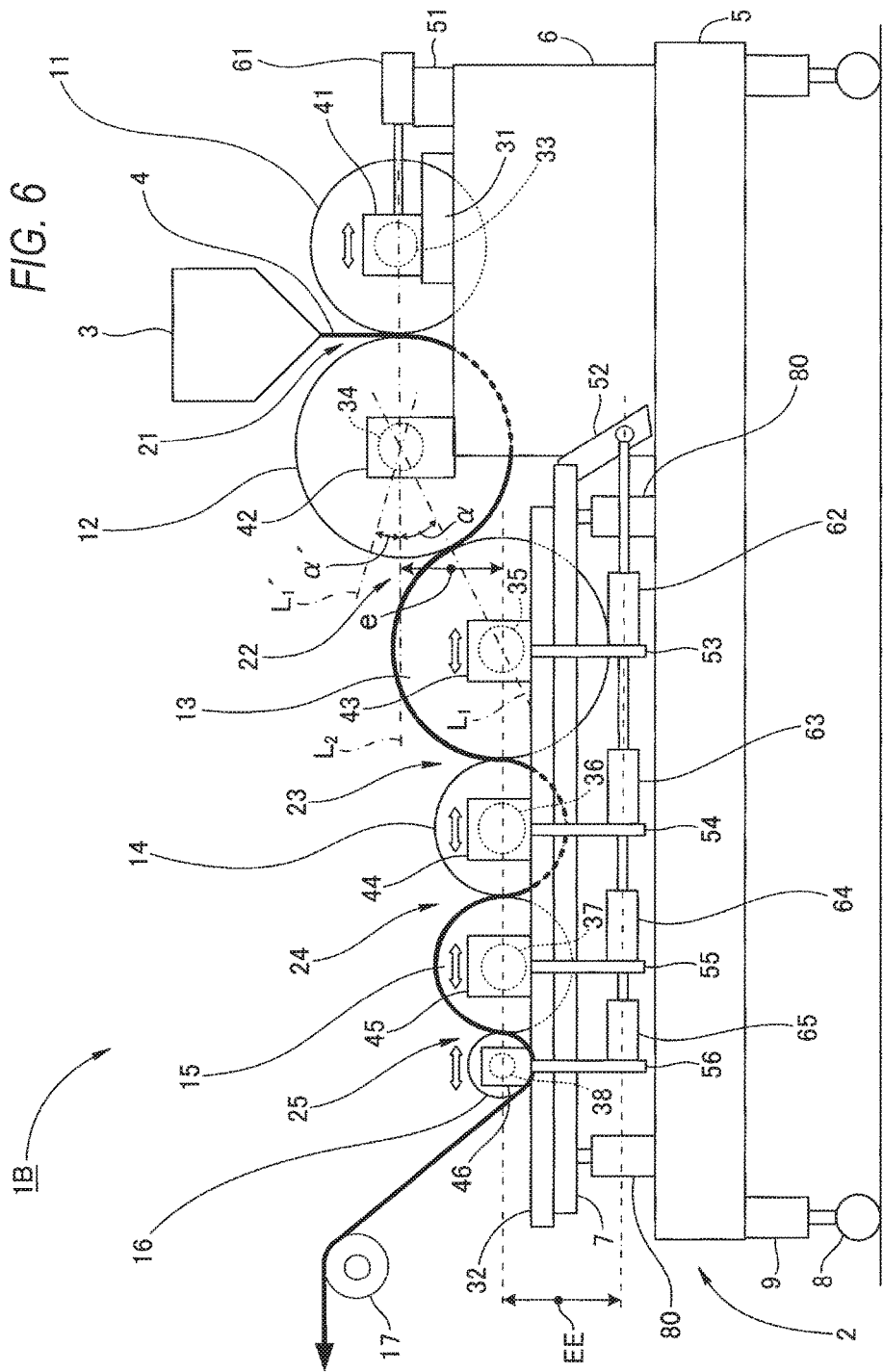
FIG. 6 is a schematic side view of the structure of a multi-stage roll type molding apparatus according to a second illustrative embodiment of the invention.

Next, description is given of a multi-stage roll type sheet molding apparatus according to a second illustrative embodiment of the invention with reference to the side view of FIG. 6 typically showing the structure of this sheet molding apparatus.

Here, in the second illustrative embodiment, the same or similar parts to the previously-mentioned first illustrative embodiment are simply given the same designations and thus the specific description thereof is omitted. In the following, description is given mainly of parts inherent in the second illustrative embodiment.

Also, for convenience of explanation, illustration of the cotter device 39 is omitted (this applies similarly to third to sixth illustrative embodiments to be discussed later).

In a sheet molding apparatus 1B according to the second illustrative embodiment, between the height position of the axes of the touch molding roll 11 and main molding roll 12 and the height position of the axes of the first to third finish molding rolls 13 to 15 and the removing roll 16, there is provided a step (the amount of this step is hereinafter called "eccentric amount e"); and, in a state shown in FIG. 6, the molding rolls 11 to 15 and the removing roll 16 are disposed such that the height position of the axes of the first to third finish molding rolls 13 to 15 and the removing roll 16 is lower than the height position of the axes of the touch molding roll 11 and main molding roll 12.

Here, a part designated by reference numeral 17 is a guide roller for guiding downstream the sheet 4 supplied from the removing roll 16.

Also, a rear-stage side rail support frame 7 is not fixedly disposed on a base frame 5 but the rear-stage side rail support frame 7 is disposed above the base frame 5. Between the base frame 5 and rear-stage side rail support frame 7, there are disposed a required number of jacks 80 (in this illustrative embodiment, a total of two jacks 80 are disposed with respect to the front and rear sides of the rear-stage side rail support frame 7 apiece; and, a total number of jacks 80 per sheet molding apparatus 1B is four). The jacks 80 are connected to each other in a power transmittable manner by a motor reducer (not shown) or the like and can be driven synchronously.

Here, the jack 80 has a sufficient strength to be able to stand a reacting force produced in a nip operation in the second nip part 22.

The jack 80 functions as lifting drive means for moving the first to third finish molding rolls 13 to 15 and the removing roll 16 in the vertical direction and, by operating the jack 80, the rear-stage side rail support frame 7 is lifted and lowered to move the first to third finish molding rolls 13 to 15 and the removing roll 16 in the vertical direction simultaneously, thereby enabling adjustment of the eccentric amount e.

This structure can move vertically the position of the second nip part 22 interposed between the main molding roll 12 and first finish molding roll 13. With respect to an angle $\alpha$ between an inclination line $L_1$ connecting together the axis of the main molding roll 12 and the axis of the first finish molding roll 13 and a horizontal line $L_2$ passing through the axis of the main molding roll 12 (which is hereinafter called "sheet delivery angle $\alpha$"), when the area thereof existing upwardly of the horizontal line $L_2$ is defined as negative (−) and the area thereof existing downwardly of the horizontal line $L_2$ as positive (+), in this illustrative embodiment, the sheet delivery angle $\alpha$ can be adjusted, for example, in the range of −30° to 50°.

Thus, a sheet winding angle (180°−$\alpha$) with respect to the main molding roll 12 and the first finish molding roll 13 becomes small or large around 180°, thereby enabling adjustment of the contact cooling distance by the molding rolls 12, 13.

For the sheet delivery angle $\alpha$>50°, when compared with the horizontal pressing force of the first finish molding roll 13, the force of nip pressure (a component in the roll center direction) becomes excessively large, whereby the nip pressure becomes unstable and the horizontal position of the first finish molding roll 13 is unable to follow the sheet in the horizontal direction according to variations in the sheet thickness.

This is the reason for setting the sheet delivery angle $\alpha \leq 50°$.

When the absolute value of the sheet delivery angle $\alpha$ is increased from the horizontal line $L_2$ toward the upper area (negative area), the sheet winding angle (180°−$\alpha$) increases in a direct proportion thereto.

Since the roll cooling area is originally large because of employment of the multi-stage roll method, the sheet hold angle of the main molding roll 12 and the first finish molding roll 13 need not be increased so much; whereas, when the sheet winding angle is large, the cooling capability increases and thus, for example, in a thick sheet of 1 mm or larger, the larger the sheet winding angle is, the more effective the molding is. In order to attain balance between the above two facts, the sheet delivery angle is set for $\alpha \geq -30°$.

According to the sheet molding apparatus 1B of the second illustrative embodiment, of course, there can be obtained similar operation effects to the sheet molding apparatus 1A of the first illustrative embodiment.

Further, according to the sheet molding apparatus 1B of the second illustrative embodiment, by operating the jack 80, the first to third finish molding rolls 13 to 15 and the removing roll 16 are moved in the vertical direction to adjust the sheet delivery angle α in the range of −30° to 50°, whereby the sheet winding angle (180°−α) is adjusted and thus the contact cooling distance by the molding rolls 12 and 13 can be adjusted.

Particularly, since a thin sheet is quick to cool, the contact cooling distance by the molding rolls 12 and 13 may be short and thus, even in the thin sheet, multiple banks can be formed at high speeds.

Also, the molding conditions can be widened according to the kind, thickness or the like of the sheet 4. For example, since crystalline resin such as PP and PE are especially sensitive to the quality of the sheet such as transparency, surface gloss and refractive index of the sheet, the above-mentioned sheet winding angle adjust function provides an adjust function important in coping with variable molding conditions.

The sheet molding apparatus 1B also employs a multi-stage roll method. Thus, since the roll cooling area is originally large, the sheet winding angle of the main molding roll 12 and first finish molding roll 13 need not be made large so much. Here, since a thick sheet is hard to cool, when molding the thick sheet, by increasing the sheet winding angle to enhance the cooling capability, even the thick sheet can be cooled effectively. For example, in a thick sheet of 1 mm or more, when the sheet delivery angle α is set for about −30° and the sheet winding angle is set for about 210°, the cooling capability works effectively.

In an optical sheet, since the quality of the sheet such as transparency, surface gloss and refractive index of the sheet must be adjusted severely, the above-mentioned sheet winding angle adjust function is effective.

Generally, in the crystalline resin (such as PP and PE), crystallization starts at about 140°; and thus, the roll cooling temperatures and sheet cooling speed around such temperature have great influences on the optical properties of the sheet such as the refractive index and transparency thereof.

Since the temperature and width of the crystallization differ from the respective resin material manufacturers, in coping with this, the above sheet winding angle adjust function is effective.

<Third Illustrative Embodiment>

Figure 7:
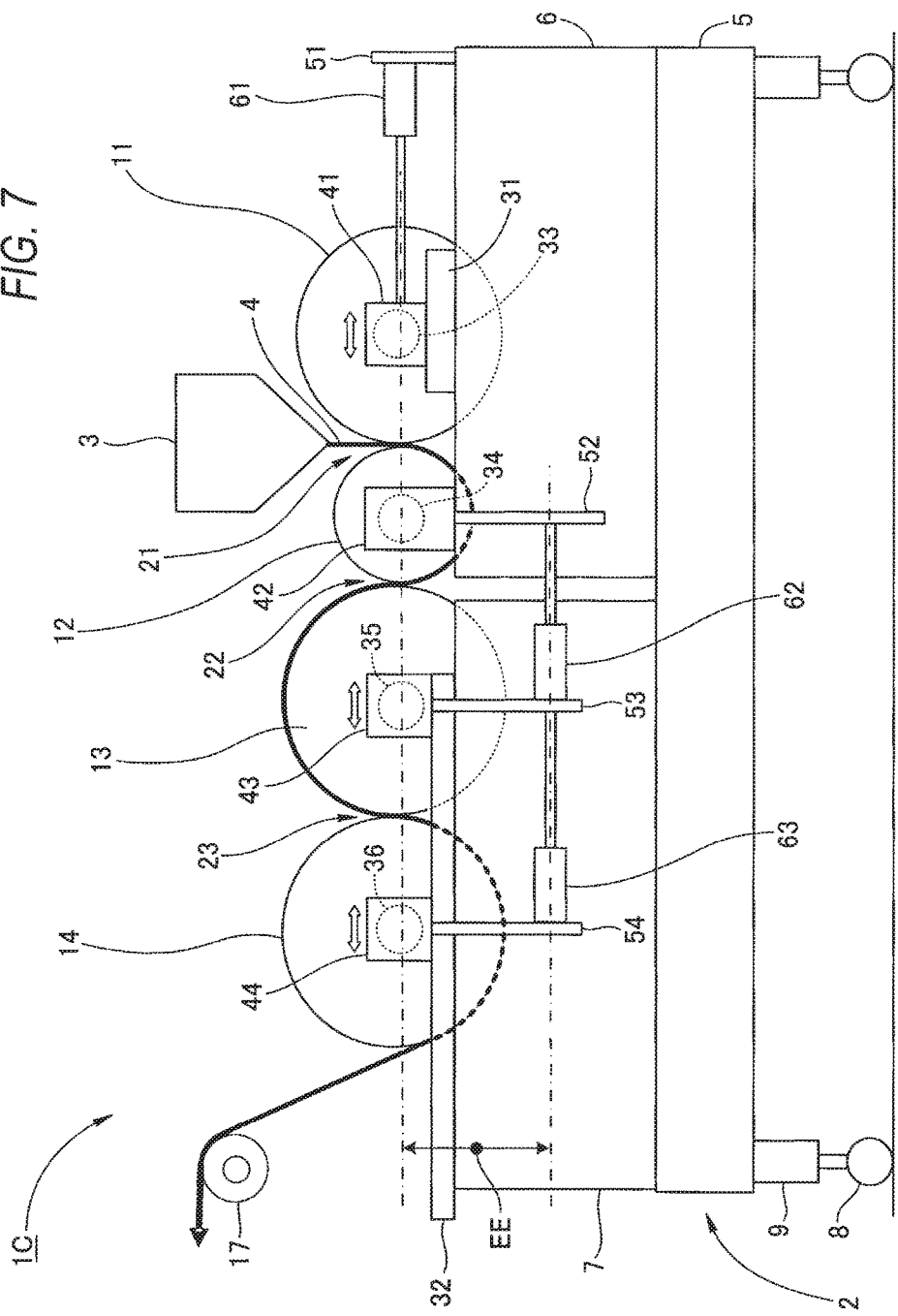
FIG. 7 is a schematic side view of the structure of a multi-stage roll type molding apparatus according to a third illustrative embodiment of the invention.

Next, description is given of a multi-stage roll type sheet molding apparatus according to a third illustrative embodiment of the invention with reference to the side view of FIG. 7 schematically showing the structure of this sheet molding apparatus.

Here, in the third illustrative embodiment, the same or similar parts to the previously-mentioned illustrative embodiments are simply given the same designations and thus the specific description thereof is omitted. In the following, description is given mainly of parts inherent in the third illustrative embodiment (this applies similarly to fourth to sixth illustrative embodiments to be discussed later).

The sheet molding apparatus 1C of the third illustrative embodiment excludes the third finish molding roll 15 and the removing roll 16 of the sheet molding apparatus 1A of the first illustrative embodiment.

Also, the roll diameter of the main molding roll 12 is smaller than the roll diameter of the first finish molding roll 13 (preferably, a dimension ratio of 0.5 to 0.8), and the touch molding roll 11, first finish molding roll 13 and second finish molding roll 14 have the same roll diameter.

Specifically, the roll diameters of the touch molding roll 11, first finish molding roll 13 and second finish molding roll 14 are all 300 mm, whereas the roll diameter of the main molding roll 12 is 200 mm.

The reason for this is as follows. In the high-speed and successive nip operations according to the multi-stage roll method, by setting small the roll diameter of the main molding roll 12 intentionally, the cooling distance/time is intentionally reduced in part to thereby increase the number of banks generated in the multiple nip parts 21 to 23.

Here, the reason why the touch molding roll 11 has a large diameter is that the length of the first nip part 21 is increased to thereby extend the cooling length on the touch molding 11 side.

Also, as the roll diameter increases, the bank becomes hard to generate but, since the main molding roll 12 has a small diameter, the touch molding roll 11 is formed to have a large diameter.

According to the sheet molding apparatus 1C of the third illustrative embodiment, since, by setting small the roll diameter of the main molding roll 12, the cooling distance/time is partially reduced to maintain the resin temperature in the high state, in molding a thin sheet quick to cool and a thick sheet slow to cool, the number of banks to be generated in the multiple nip parts 21 to 23 can be increased, and the gloss and transparency of the sheet surface can be further enhanced by the successive nip operations according to the multi-stage roll method.

In the sheet molding apparatus 1C of the third illustrative embodiment, the roll diameter of the main molding roll 12 is a small diameter of 200 mm, while the roll diameters of the touch molding roll 11, first finish molding roll 13 and second finish molding roll 14 are all 300 mm.

Meanwhile, in the related-art sheet molding apparatus 100, the roll diameters of the touch molding roll 101, main molding roll 102 and finish molding roll 103 are all 300 mm.

Therefore, in the sheet molding apparatus 1C, the cooling length between the main molding roll 12 and first finish molding roll 13 is about ⅔ of the related-art sheet molding apparatus 100 and the resin temperature is higher than that of the related-art apparatus, whereby the banks can be positively formed at least in the two locations of the first and second nip parts 21 and 22.

Particularly, since, the air layer contact surface side of the sheet 4 opposite to the molding roll contact surface thereof is maintained at higher temperatures, depending on the roll peripheral speed (sheet feed speed) and sheet thickness, for example, when a PP sheet has a thickness of 0.4 mm and the speed is about 20 m/min, in the sheet molding apparatus 1C of the third illustrative embodiment, bank formation is confirmed even in the second nip part 22, whereas, in the related-art sheet molding apparatus 100, bank formation is not confirmed.

Also, the sheet 4 molded by the sheet molding apparatus 1C of the third illustrative embodiment, when compared with the sheet 105 molded by the related-art sheet molding apparatus 100, has excellent transparency and also excellent surface gloss.

Here, to provide the above effect, the roll diameter of the main molding roll 12 to the roll diameter of the first finish molding roll 13 may preferably provide a ratio of 0.5 to 0.8.

When the ratio is smaller than 0.5, the roll strength is insufficient and a bank in a thick sheet is excessively large, a sheet surface drawback such as a bank mark is easy to occur and thus such ratio is not practical.

Meanwhile, when the ratio exceeds 0.8, the roll diameter reduction effect cannot be provided sufficiently.

<Fourth Illustrative Embodiment>

Figure 8:
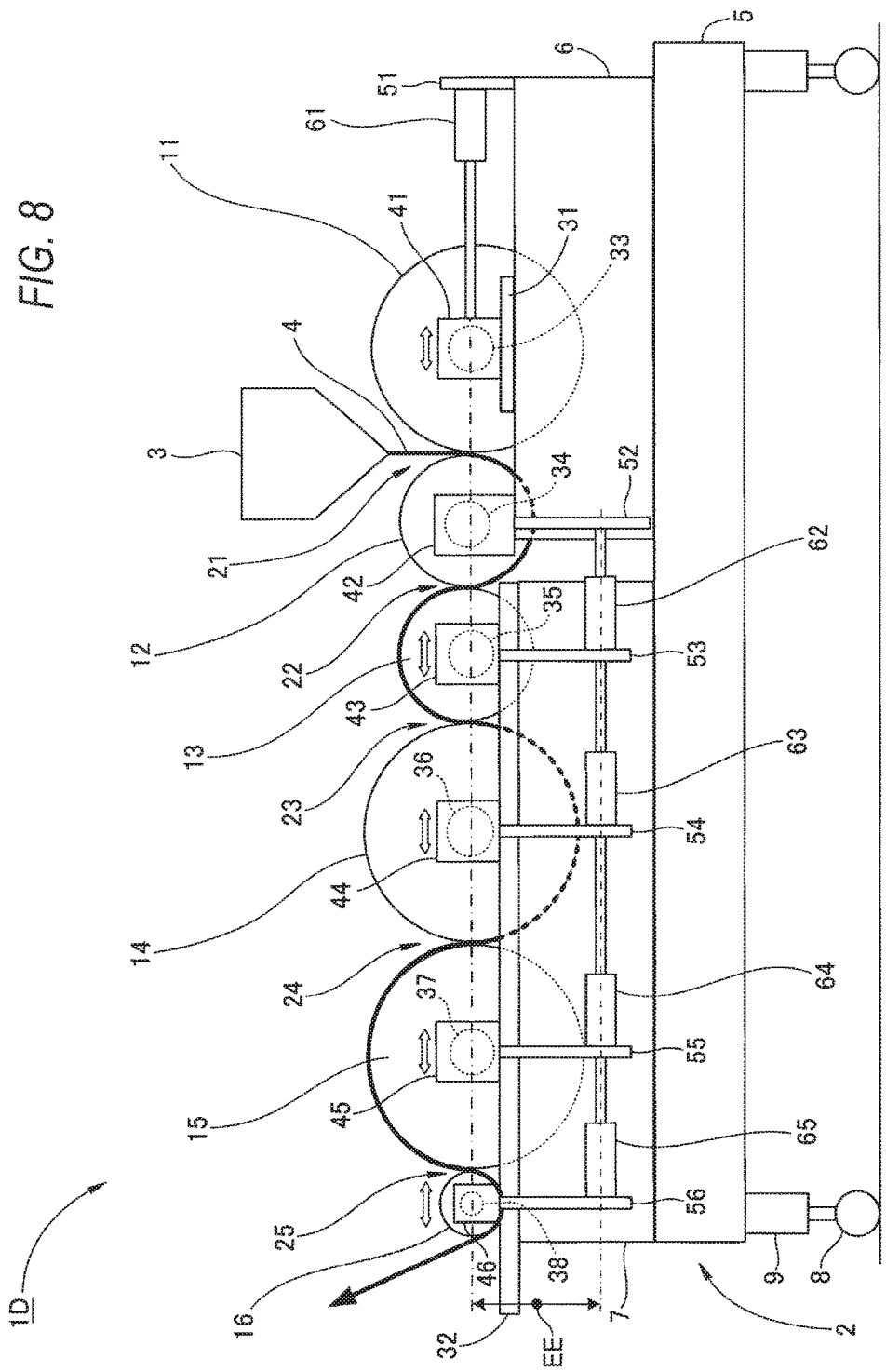
FIG. 8 is a schematic side view of the structure of a multi-stage roll type molding apparatus according to a fourth illustrative embodiment of the invention.

Next, description is given of a multi-stage roll type sheet molding apparatus according to a fourth illustrative embodiment of the invention with reference to the side view of FIG. 8 typically showing the structure of this sheet molding apparatus.

In the sheet molding apparatus 1A (see FIG. 1) of the first illustrative embodiment, the roll diameters of the touch molding roll 11, the main molding roll 12 and the first finish molding roll 13 are set equal to each other and are relatively large, whereas, in the sheet molding apparatus 1D of the fourth illustrative embodiment, the roll diameters of the main molding roll 12 and first finish molding roll 13 are set equal to each other and are relatively small, and the roll diameters of the touch molding roll 11, and second finish molding roll 14 and third finish molding roll 15 are set equal to each other and are relatively large.

Specifically, the roll diameters of the touch molding roll 11, the second finish molding roll 14 and the third finish molding roll 15 are all 300 mm, whereas the roll diameters of the main molding roll 12 and the first finish molding roll 13 are 200 mm.

According to the sheet molding apparatus of the fourth illustrative embodiment, since the cooling length to the first to third nip parts 21 to 23 is in part further shorter, banks can be positively formed in at least three locations of the first nip part 21, second nip part 22 and third nip part 23 and thus the number of banks to be formed can be increased over the sheet molding apparatus 1C of the third illustrative embodiment.

Therefore, even when the sheet thickness is thin (for example, a thickness of 0.6 mm or less) and is hard to form a bank, the number of banks can be increased, and sheet quality enhancement and speedup can be attained, or, in the case of a thick sheet having a thickness of 0.6 mm or more, the number of banks can be increased, thereby enabling enhancement in sheet quality.

<Fifth Illustrative Embodiment>

Figure 9:
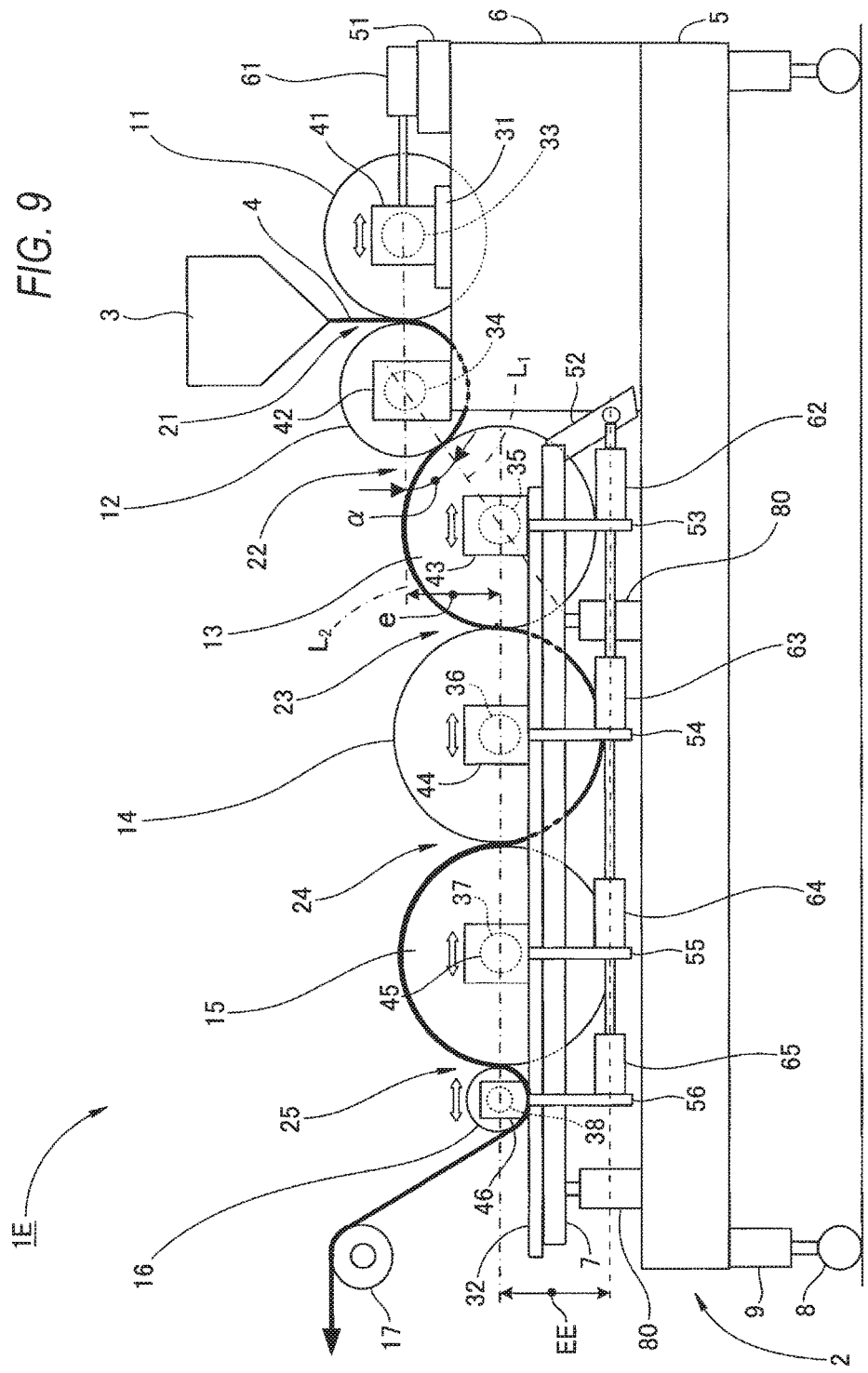
FIG. 9 is a schematic side view of the structure of a multi-stage roll type molding apparatus according to a fifth illustrative embodiment of the invention.

Next, description is given of a multi-stage roll type sheet molding apparatus according to a fifth illustrative embodiment of the invention with reference to the side view of FIG. 9 showing typically the structure of this sheet molding apparatus.

The sheet molding apparatus 1E of the fifth illustrative embodiment is embodied such that the roll diameter of the main molding roll 12 in the sheet molding apparatus 1B (see FIG. 6) of the second illustrative embodiment is set smaller than that of the first finish molding roll 13, and the roll diameters of the second finish molding roll 14 and the third finish molding roll 15 in the sheet molding apparatus 1B of the second illustrative embodiment sheet are set equal to that of the first finish molding roll 13.

In the sheet molding apparatus 1E of the fifth illustrative embodiment, since, by operating jacks 80, the first to third finish molding rolls 13 to 15 and removing roll 16 are moved in the vertical direction, the sheet delivery angle α can be adjusted in the range of 0° to 50°.

According to the sheet molding apparatus 1E of the fifth illustrative embodiment, similarly to the sheet molding apparatus 1B of the second illustrative embodiment, since, by operating the jacks 80, the first to third finish molding rolls 13 to 15 and the removing roll 16 are moved in the vertical direction to adjust the sheet delivery angle α in the range of 0° to 50° and thus adjust the sheet winding angle (180°−α), the contact cooling distance by the main molding roll 12 and first finish molding roll 13 can be adjusted; and, similarly to the sheet molding apparatus 1C (see FIG. 7) of the third illustrative embodiment, since the cooling length from the first nip part 21 to the second nip part 22 can be made in part further shorter, banks can be positively formed in at least two locations of the first and second nip parts 21 and 22 and the number of banks to be formed can be increased, whereby the effects of both of the second and third illustrative embodiments can be provided.

<Sixth Illustrative Embodiment>

Figure 10:
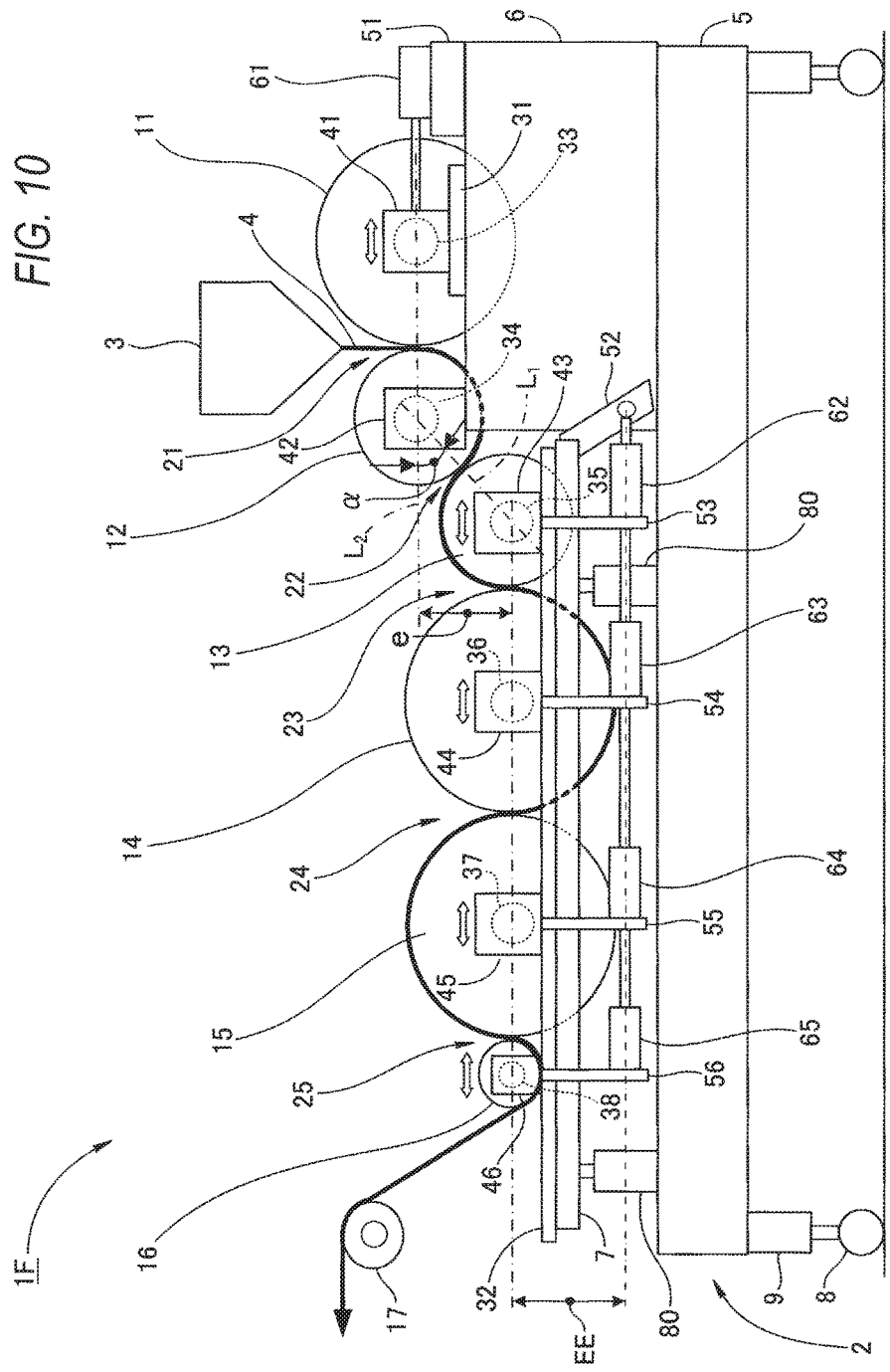
FIG. 10 is a schematic side view of the structure of a multi-stage roll type molding apparatus according to a sixth illustrative embodiment of the invention.

Next, description is given of a multi-stage roll type sheet molding apparatus according to a sixth illustrative embodiment of the invention with reference to the side view of FIG. 10 showing typically the structure of this sheet molding apparatus.

The sheet molding apparatus 1F of the sixth illustrative embodiment is embodied such that the roll diameter of the first finish molding roll 13 in the sheet molding apparatus 1E (see FIG. 9) of the fifth illustrative embodiment is set equal to that of the main molding roll 12 and smaller than that of the second finish molding roll 14.

According to the sheet molding apparatus 1F of the sixth illustrative embodiment, of course, there can be provided similar operation effects to the sheet molding apparatus 1E of the fifth illustrative embodiment and, since the cooling distance to the first to third nip parts 21 to 23 can be made in part further shorter, the range of the number of banks to be formed can be increased over the sheet molding apparatus 1E of the fifth illustrative embodiment.

Although, description has been given heretofore of the multi-stage roll type sheet molding apparatus of the invention, the invention is not limited to the structures mentioned in the above illustrative embodiments but the structures can be changed properly without departing from the subject matter of the invention, for example, the structures mentioned in the illustrative embodiments can be combined properly.

In the above respective illustrative embodiments, all of the molding rolls 11 to 15 may also be constituted of a rigid roll or an elastic roll.

For the sheet thickness of 0.4 mm or more, depending on the sheet material, even when the molding rolls 11 to 15 are all made of rigid rolls, a sheet can be molded properly.

Meanwhile, when the molding rolls 11 to 15 are all made of rigid rolls, close contact performance between the sheet 4 and molding rolls 11 to 15 is further enhanced, whereby sheet cooling can be made uniform in the width direction, cooling performance can be also enhanced, and molding speed can be increased, thereby attaining enhanced productivity.

In the above illustrative embodiments, one of two adjacent molding rolls 11, 12; 12, 13; 13, 14; and 14, 15 may be constituted of an elastic roll, the other may be constituted of a rigid roll, and they may be disposed alternately.

As an elastic roll, there may be employed a roll having a dual pipe roll structure in which the thin outer cell thereof has a roll radius of 0.03 times or less.

In the first, second and fourth to sixth illustrative embodiments, there is shown an example in which the three finish molding rolls 13 to 15 are disposed, but two finish molding rolls may be disposed, or, of course, four or more finish molding rolls may be disposed.

In the first and second illustrative embodiments, there is shown an example in which the roll outside diameters of the touch molding roll 11, the main molding roll 12 and the first finish molding roll 13 are 300 mm, the roll outside diameters of the second and third finish molding rolls 14 and 15 are 250 mm, and all molding rolls have a roll surface length of 1400 mm. However, with the other illustrative embodiments included, the roll outside diameter may be set properly, for example, when the roll outside diameter is increased, a thick sheet can be molded at higher speeds; and, the roll length surface may also be set properly according to the necessary sheet width.

Although there is shown an example in which, as slide drive means for moving the molding rolls 11 to 15 and the removing roll 16, there are used the hydraulic cylinders 61 to 65, alternatively there may also be employed an electric direct motion actuator using an air cylinder or a ball screw.

Although there is shown an example in which the height positions of the cylinder axes of the second to fifth hydraulic cylinders 62 to 65 are all made coincident with each other at a position which is spaced downward by the eccentric amount EE from the height position of the axes of the molding rolls 13 to 15 and the removing roll 16, the hydraulic cylinders 62 to 65 may also be disposed such that they are shifted in the vertical direction or in the right and left direction.

Any one of the molding rolls 11 to 15 may also be an engraved roll or a satin-finished roll.

The multi-stage roll type sheet molding apparatus of the invention has the characteristic that the apparatus can mold both of thin sheets and thick sheets at high speeds and with high quality. Therefore, for example, it can be suitably applied to a use in which molten resin is pressurized by a molding roll to produce a long resin film or sheet, that is, it has great industrial applicability.

The multi-stage roll type sheet molding apparatus of the disclosure provides four or more molding rolls used to mold the sheet, whereas the related-art sheet molding apparatus provides three molding rolls.

Thus, the cooling distance of the sheet to be molded by the molding rolls can be increased.

Also, the number of nip parts for holding/pressing the sheet by two mutually adjacent molding rolls is three or more, whereas the related-art molding apparatus provides two nip parts. That is, the hold/press operation (which is hereinafter called "nip operation") on the sheet is performed in three or more nip parts which are more than the nip parts of the related-art sheet molding apparatus.

Thus, since the molding roll and sheet can be contacted with each other without intervening an air layer between them, the heat of the sheet is easy to be transferred to the molding roll, thereby enabling enhancement in cooling efficiency.

Also, with respect to the number of cooling times on the front and back surfaces of the sheet by the molding rolls, the disclosure provides two or more cooling times on both of the front and back surfaces, whereas the related-art molding apparatus 100 provides one cooling time on the front surface and two times on the back surface. The number of cooling repetition times on both sides of the sheet can be increased, whereby the total contact time between the molding roll and sheet on both sides of the sheet can be made substantially equal to each other.

Thus, the high temperature part of the sheet exists in the center thereof in the thickness direction and the substantial sheet thickness can be converted to the thickness of a thin sheet having a half thickness in the case of one-side cooling.

Therefore, according to the multi-stage roll type sheet molding apparatus of the disclosure, the contact cooling distance between the molding roll and sheet can be increased over the related-art sheet molding apparatus 100 and both sides of the sheet can be cooled uniformly, thereby enabling remarkable enhancement in the total cooling capability. Also, since the gloss and transparency of the sheet surface can be enhanced due to three or more nip operation times which are more than the nip operation times in the related-art sheet molding apparatus 100, even a thick sheet slow to cool (for example, a sheet having a thickness dimension t=0.6 mm or more) can be molded at high speeds and with high quality.

Also, according to the multi-stage roll type sheet molding apparatus of the disclosure, the molten sheet is supplied downward from above to the nip part between the touch molding roll and main molding roll and is compressed by the touch molding roll and main molding roll.

Since a thin sheet (for example, a sheet having a thickness dimension t=0.1 to 0.6 mm or less) is quick to cool, for uniform cooling, it is important to bring the sheet both surfaces into contact with the touch molding roll and main molding roll simultaneously. Employment of the above-mentioned molten sheet supply method enables simultaneous and stable contact of both sides of the sheet with the touch molding roll and main molding roll.

Also, even when the speed of the present apparatus is increased more than the related-art sheet molding apparatus 100, the gloss and transparency of the sheet surface can be enhanced by three or more times of nip operations which are more than the related-art sheet molding apparatus 100.

Therefore, even the thin sheet slow to cool can be molded at high speeds and with high quality.

Here, since, by setting the roll diameter of the main molding roll smaller than that of the first finish molding roll of the multiple finish molding rolls that is adjacent to the main molding roll, the cooling distance/time by the main molding roll is in part reduced and the resin is maintained at high temperatures, the number of banks to be generated in the multiple nip parts can be increased when molding the thin sheet quick to cool and the thick sheet slow to cool, and thus the gloss and transparency of the sheet surface can be enhanced by the successive nip operations performed according to the multi-stage roll method.

Also, since, by setting the roll diameter of the main molding roll and the roll diameter of the first finish molding roll of the multiple finish molding rolls adjacent to the main molding roll to be smaller than the roll diameter of the second finish molding roll of the multiple finish molding rolls adjacent to the first finish molding roll, the cooling distance/time by the main molding roll and first finish molding roll is in part reduced further and the resin is maintained at higher temperatures, the number of banks to be generated in the multiple nip parts can be increased more when molding the thin sheet quick to cool and the thick sheet slow to cool, and thus the gloss and transparency of the sheet surface can be enhanced further by the successive nip operations performed according to the multi-stage roll method.

Also, due to provision of a step between the height positions of the axes of the touch molding roll and main molding roll and the height positions of the axes of the multiple finish molding rolls, a sheet winding angle from the main molding roll side to the finish molding roll side can be increased or decreased on the basis of the sheet winding angle when the step is not provided.

Also, since, due to provision of the lifting drive device for moving the multiple finish molding rolls in the vertical direction, the height positions of the multiple finish molding rolls can be adjusted, the sheet winding angle from the main molding roll side to the finish molding roll side can be adjusted and thus the contact cooling distance by the molding roll can be adjusted.

Also, since, of the molding rolls, at least the touch molding roll can be constituted of an elastic roll, or, of the molding rolls, the touch molding roll and at least one of the molding rolls except for the touch molding roll are constituted of an elastic roll, the contact between the sheet and roll surface can be enhanced, whereby sheet contact performance uniform in the width direction and uniform sheet cooling performance can be provided.

What is claimed is:

1. A multi-stage roll type sheet molding apparatus comprising:
    four or more molding rolls comprising a touch molding roll, a main molding roll and a plurality of finish molding rolls disposed in parallel to each other in this order from a front stage side toward a rear stage side in a horizontal direction,
    wherein the sheet molding apparatus is configured to supply a molten sheet downward from above to a nip part between the touch molding roll and the main molding roll, compress the sheet by the touch molding roll and the main molding roll, and feed the compressed sheet sequentially windingly fed from the main molding roll to the finish molding rolls, thereby molding a sheet having a specific thickness, and
    wherein the sheet molding apparatus further comprises:
        a guide device configured to horizontally guide the finish molding rolls respectively relative to molding rolls disposed on the front-stage side; and
        a slide drive device configured to horizontally move the finish molding rolls being guided by the guide device relative to a respective one of the molding rolls disposed adjacently on the front-stage side for pressing the sheet therebetween, and
    wherein a sheet delivery angle $\alpha$ is defined as an angle between a horizontal line extending through an axis of the main molding roll, and a connecting line extending through the axis of the main molding roll and an axis of a first finish molding roll, and
    wherein the sheet delivery angle $\alpha$ is in a range of −30 degrees to 50 degrees, and
    wherein the sheet delivery angle $\alpha$ has a negative value when the connecting line is above the horizontal line and a positive value when the connecting line is below the horizontal line, and
    wherein the first finish molding roll is adjacent to the main molding roll.

2. The multi-stage roll type sheet molding apparatus according to claim 1, wherein a roll diameter of the main molding roll is set smaller than a roll diameter of the first finish molding roll of the finish molding rolls, the first finish molding roll being adjacent to the main molding roll.

3. The multi-stage roll type sheet molding apparatus according to claim 1, wherein a roll diameter of the main molding roll, and a roll diameter of the first finish molding roll of the finish molding rolls are set smaller than a roll diameter of a second finish molding roll of the finish molding rolls, the first finish molding roll being adjacent to the main molding roll, the second finish molding roll being adjacent to the first finish molding roll.

4. The multi-stage roll type sheet molding apparatus according to claim 1, wherein there is provided a step between a first height and a second height, such that axes of the touch molding roll and the main molding roll are positioned at the first height, and axes of the finish molding rolls are positioned at the second height.

5. The multi-stage roll type sheet molding apparatus according to claim 1, further comprising:
    a lifting drive device configured to move the finish molding rolls in a vertical direction, thereby enabling adjustment of height positions of the finish molding rolls.

6. The multi-stage roll type sheet molding apparatus according to claim 1, wherein, the touch molding roll is an elastic roll.

7. The multi-stage roll type sheet molding apparatus according to claim 1, wherein, the touch molding roll and at least one of the molding rolls other than the touch molding roll are elastic rolls.

8. The multi-stage roll type sheet molding apparatus according to claim 1, wherein the plurality of finish molding rolls are each disposed at a same vertical height.

9. The multi-stage roll type sheet molding apparatus according to claim 1, wherein the main molding roll and the first finish molding roll are each disposed at a same vertical height.

10. The multi-stage roll type sheet molding apparatus according to claim 1, wherein the guide device comprises a pair of rails extending in a longitudinal direction, and the slide drive device comprises an actuator.

11. A multi-stage roll type sheet molding apparatus comprising:
    molding rolls configured to mold a sheet, the molding rolls comprising:
        a touch molding roll;
        a main molding roll disposed on a rear-stage side of the touch molding roll in parallel to the touch molding roll in a horizontal direction; and
        a plurality of finish molding rolls disposed in parallel to each other in the horizontal direction and disposed on the rear stage side of the main molding roll;
    a T die configured to supply a molten sheet downward from above to a nip part between the touch molding roll and the main molding roll;
    a guide device configured to guide the finish molding rolls relative to the main molding roll; and
    a slide drive device configured to horizontally move the molding rolls being guided by the guide device relative to an adjacent molding roll,
    wherein the touch molding roll and the main molding roll are configured to compress the molten sheet supplied from the T die, and
    wherein the finish molding rolls are configured to feed the compressed sheet windingly from the main molding roll to the finish molding rolls so as to mold the sheet,
    wherein a sheet delivery angle $\alpha$ is defined as an angle between a horizontal line extending through an axis of the main molding roll, and a connecting line extending through the axis of the main molding roll and an axis of a first finish molding roll, and
    wherein the sheet delivery angle $\alpha$ is in a range of −30 degrees to 50 degrees,
    wherein the sheet delivery angle $\alpha$ has a negative value when the connecting line is above the horizontal line and a positive value when the connecting line is below the horizontal line, and wherein the first finish molding roll is adjacent to the main molding roll.

12. The multi-stage roll type sheet molding apparatus according to claim 11, wherein the plurality of finish molding rolls are each disposed at a same vertical height.

13. The multi-stage roll type sheet molding apparatus according to claim 11, wherein the main molding roll and the first finish molding roll are each disposed at a same vertical height.

14. The multi-stage roll type sheet molding apparatus according to claim 11, wherein the guide device comprises a pair of rails extending in a longitudinal direction, and the slide drive device comprises an actuator.

* * * * *